United States Patent
Vafai et al.

(10) Patent No.: US 12,443,252 B2
(45) Date of Patent: Oct. 14, 2025

(54) HEAT TRANSFER ENHANCEMENT FOR THREE-DIMENSIONAL INTEGRATED CIRCUIT CHIPS

(71) Applicant: Kambix Innovations II, LLC, Albuquerque, NM (US)

(72) Inventors: Kambiz Vafai, Mission Viejo, CA (US); Chao Wang, Riverside, CA (US)

(73) Assignee: Kambix Innovations, LLC, Albuquerque, NM (US)

( * ) Notice: Subject to any disclaimer, the term of this patent is extended or adjusted under 35 U.S.C. 154(b) by 0 days.

(21) Appl. No.: 18/822,246

(22) Filed: Sep. 1, 2024

(65) Prior Publication Data

US 2025/0155943 A1     May 15, 2025

Related U.S. Application Data

(60) Provisional application No. 63/536,434, filed on Sep. 4, 2023.

(51) Int. Cl.
   *G06F 1/20*     (2006.01)

(52) U.S. Cl.
   CPC ...... *G06F 1/20* (2013.01); *H01L 2225/06541* (2013.01); *H01L 2225/06589* (2013.01)

(58) Field of Classification Search
   CPC ............. G06F 1/20; H01L 2224/16145; H01L 2225/06541; H01L 2225/06589
   See application file for complete search history.

(56) References Cited

U.S. PATENT DOCUMENTS

| | | | |
|---|---|---|---|
| 2012/0038057 A1* | 2/2012 | Bartley | H01L 23/50 257/E23.174 |
| 2014/0281311 A1* | 9/2014 | Walker | G06F 3/0631 711/170 |

(Continued)

FOREIGN PATENT DOCUMENTS

CN     114896920 A  *  8/2022  .............. G06F 30/33

OTHER PUBLICATIONS

J.H. Lau, Recent advances and trends in advanced packaging, IEEE Transactions on Components, Packaging and Manufacturing Technology, 12 (2022) 228-252.

(Continued)

*Primary Examiner* — Mark A Connolly
(74) *Attorney, Agent, or Firm* — Luis M. Ortiz; Kermit D. Lopez

(57) ABSTRACT

In an embodiment, a method for fast prediction of hotspot temperatures in three-dimensional (3D) integrated circuit (IC) chips, can involve inputting a dataset comprising thermal simulation data and associated parameters for 3D IC chips, wherein the dataset includes variables such as power distribution, processor core location distribution, and Through Silicon Via (TSV) distribution, applying a K-fold Cross Validation (K-CV) algorithm to train a machine learning model using the inputted dataset, wherein the K-CV algorithm is employed to optimize the training process and prevent overfitting, utilizing a Support Vector Regression (SVR) algorithm within the trained machine learning model to predict hotspot temperatures of the 3D IC chips, and adjusting a cooling strategy for cooling the 3D IC chips, in response to monitoring the hotspot temperatures via the trained machine learning model. The 3D IC chip can include (Continued)

a multi-layer structure including a group of vertically stacked semiconductor layers.

20 Claims, 18 Drawing Sheets

(56) References Cited

U.S. PATENT DOCUMENTS

| | | | | |
|---|---|---|---|---|
| 2016/0062340 | A1* | 3/2016 | Ogawa | H05K 7/20836 700/299 |
| 2016/0286689 | A1* | 9/2016 | Wu | H05K 7/20 |

OTHER PUBLICATIONS

M. Chen, C. Lin, E. Liao, W. Chiou, C. Kuo, C. Hu, C. Tsai, C. Wang, D. Yu, SoIC for low-temperature, multi-layer 3D memory integration, in: 2020 IEEE 70th Electronic Components and Technology Conference (ECTC), IEEE, 2020, pp. 855-860.

Y. Chen, C. Yang, C. Kuo, M. Chen, C. Tung, W. Chiou, D. Yu, Ultra high density SoIC with sub-micron bond pitch, in: 2020 IEEE 70th Electronic Components and Technology Conference (ECTC), IEEE, 2020, pp. 576-581.

D. Ingerly, S. Amin, L. Aryasomayajula, A. Balankutty, D. Borst, A. Chandra, K. Cheemalapati, C. Cook, R. Criss, K. Enamul, Foveros: 3D integration and the use of face-to-face chip stacking for logic devices, in: 2019 IEEE International Electron Devices Meeting (IEDM), IEEE, 2019, pp. 19.16. 11-19.16. 14.

J. Kong, Y.-H. Gong, S.W. Chung, Architecting large-scale SRAM arrays with monolithic 3D integration, in: 2017 IEEE/ACM International Symposium on Low Power Electronics and Design (ISLPED), IEEE, 2017, pp. 1-6.

X. Chen, N.K. Jha, A 3-D CPU-FPGA-DRAM hybrid architecture for low-power computation, IEEE Transactions on Very Large Scale Integration (VLSI) Systems, 24 (2015) 1649-1662.

L. Yavits, A. Morad, R. Ginosar, The effect of temperature on Amdahl law in 3D multicore era, IEEE Transactions on Computers, 65 (2015) 2010-2013.

J. Knechtel, J. Lienig, I.M. Elfadel, Multi-objective 3D floorplanning with integrated voltage assignment, ACM Transactions on Design Automation of Electronic Systems (TODAES), 23 (2017) 1-27.

P. Budhathoki, A. Henschel, I.A.M. Elfadel, Thermal-driven 3D floorplanning using localized TSV placement, in: 2014 IEEE International Conference on IC Design & Technology, IEEE, 2014, pp. 1-4.

D. Saha, S. Sur-Kolay, Multi-objective optimization of placement and assignment of TSVs in 3D ICs, in: 2017 30th International Conference on VLSI Design and 2017 16th International Conference on Embedded Systems (VLSID), IEEE, 2017, pp. 372-377.

T.-H. Tsai, Y.-S. Chen, X.-X. He, C.-Y. Li, STEM: a thermal-constrained real-time scheduling for 3D heterogeneous-ISA multicore processors, IEEE Transactions on Computers, 67 (2017) 874-889.

C. Yoon, J.H. Shim, B. Moon, J. Kong, 3D die-stacked DRAM thermal management via task allocation and core pipeline control, IEICE Electronics Express, 15 (2018) 20171253-20171253.

S. Feng, Y. Yan, H. Li, Z. Yang, L. Li, L. Zhang, Theoretical and numerical investigation of embedded microfluidic thermal management using gradient distribution micro pin fin arrays, Applied thermal engineering, 153 (2019) 748-760.

L. Sun, M.-h. Chen, L. Zhang, P. He, L.-s. Xie, Recent progress in SLID bonding in novel 3D-IC technologies, Journal of Alloys and Compounds, 818 (2020) 152825.

D. Ansari, K.-Y. Kim, Hotspot thermal management using a microchannel-pinfin hybrid heat sink, International Journal of Thermal Sciences, 134 (2018) 27-39.

I.H. Jeong, A. Eslami Majd, J.P. Jung, N.N. Ekere, Electrical and mechanical analysis of different TSV geometries, Metals, 10 (2020) 467.

P.-N. Hsu, K.-C. Shie, K.-P. Chen, J.-C. Tu, C.-C. Wu, N.-T. Tsou, Y.-C. Lo, N.-Y. Chen, Y.-F. Hsieh, M. Wu, Artificial intelligence deep learning for 3D IC reliability prediction, Scientific Reports, 12 (2022) 1-7.

K. Pandiaraj, P. Sivakumar, K.J. Prakash, Machine learning based effective linear regression model for TSV layer assignment in 3DIC, Microprocessors and Microsystems, 83 (2021) 103953.

A. Kumar, N. Chang, D. Geb, H. He, S. Pan, J. Wen, S. Asgari, M. Abarham, C. Ortiz, ML-based Fast On-Chip Transient Thermal Simulation for Heterogeneous 2.5 D/3D IC Designs, in: 2022 International Symposium on VLSI Design, Automation and Test (VLSI-DAT), IEEE, 2022, pp. 1-8.

V. Radmard, Y. Hadad, S. Rangarajan, C.H. Hoang, N. Fallahtafti, C.L. Arvin, K. Sikka, S.N. Schiffres, B.G. Sammakia, Multi-objective optimization of a chip-attached micro pin fin liquid cooling system, Applied thermal engineering, 195 (2021) 117187.

F. Tavakkoli, S. Ebrahimi, S. Wang, K. Vafai, Analysis of critical thermal issues in 3D integrated circuits, International Journal of Heat and Mass Transfer, 97 (2016) 337-352.

F. Tavakkoli, S. Ebrahimi, S. Wang, K. Vafai, Thermophysical and geometrical effects on the thermal performance and optimization of a three-dimensional integrated circuit, Journal of Heat Transfer, 138 (2016).

T.J. Young, K. Vafai, Convective cooling of a heated obstacle in a channel, International Journal of Heat and Mass Transfer, 41 (1998) 3131-3148.

V. Bianco, M. De Rosa, K. Vafai, Phase-change materials for thermal management of electronic devices, Applied thermal engineering, 214 (2022) 118839.

S. Lu, K. Vafai, Optimization of the Thermal Performance of Three-Dimensional Integrated Circuits (3D ICs) Utilizing Rectangular-Shaped and Disk-Shaped Heat Pipes, Journal of Heat Transfer, (2022).

A. Tavakoli, K. Vafai, Design and Optimization of a Composite Heat Spreader to Improve the Thermal Management of a Three-Dimensional Integrated Circuit, Journal of Heat Transfer, 143 (2021).

H.-W. Hu, K.-N. Chen, Development of low temperature CuCu bonding and hybrid bonding for three-dimensional integrated circuits (3D IC), Microelectronics Reliability, 127 (2021) 114412.

\* cited by examiner

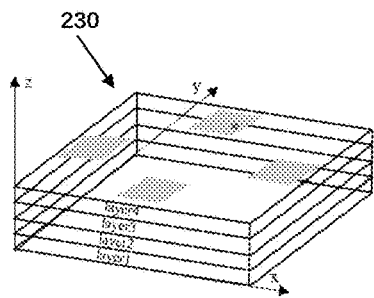 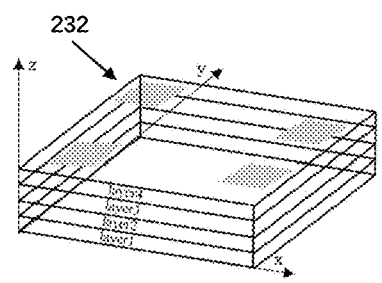 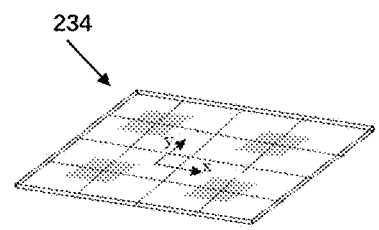
FIG. 9A · FIG. 9B
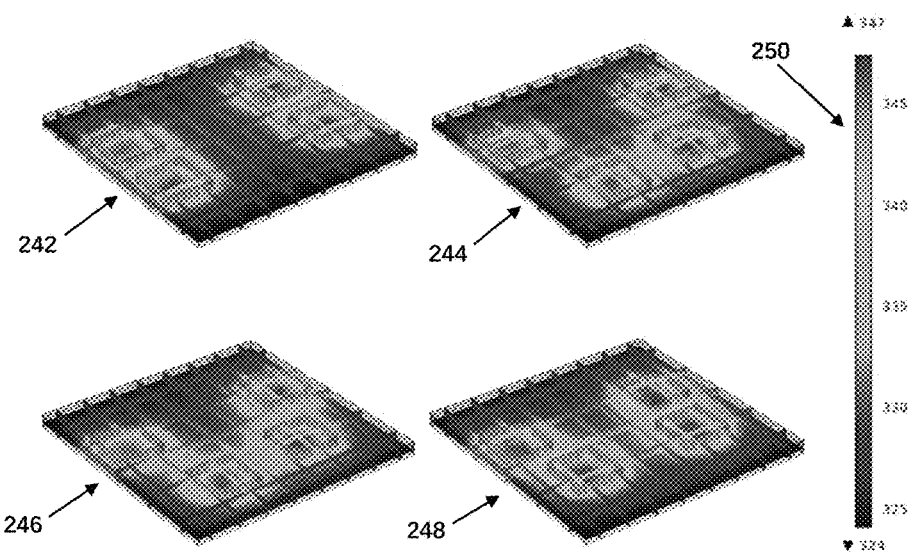
FIG. 10A

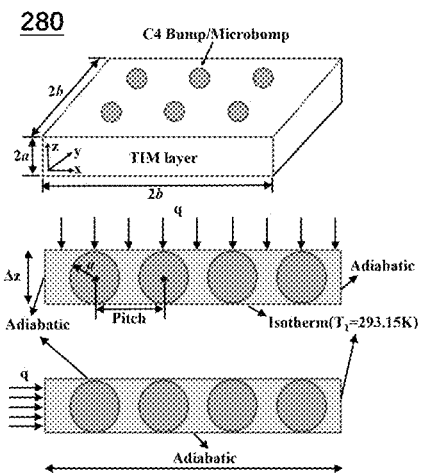
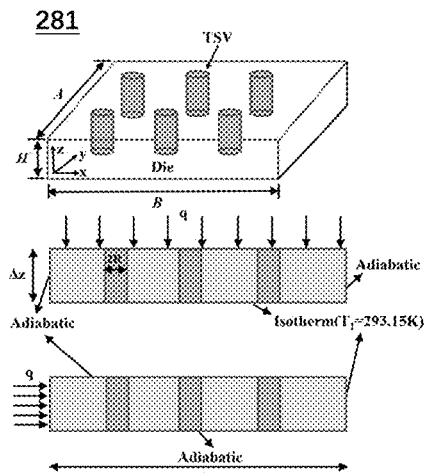
FIG. 12A  FIG. 12B
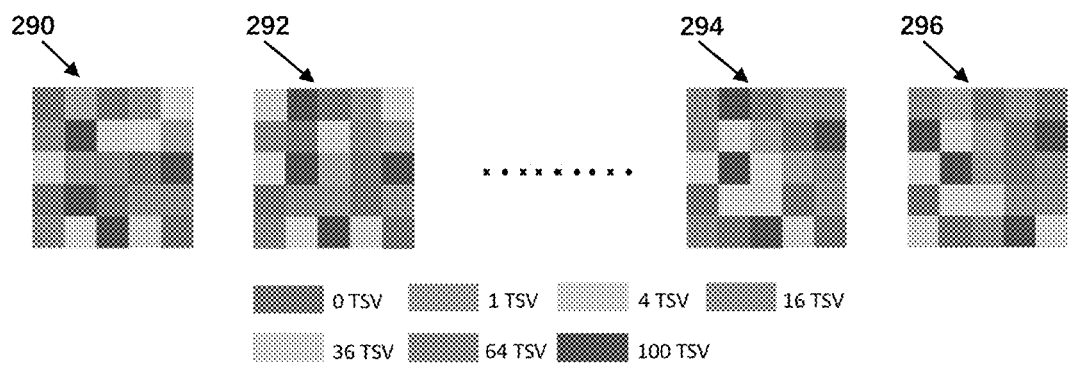
FIG. 13

HEAT TRANSFER ENHANCEMENT FOR THREE-DIMENSIONAL INTEGRATED CIRCUIT CHIPS

CROSS REFERENCE TO PATENT APPLICATION

This patent application claims priority under 35 U.S.C. § 119 to U.S. Provisional Patent Application Ser. No. 63/536,434 entitled "Heat Transfer Enhancement for 3D Chip Thermal Simulation and Prediction," which was filed on Sep. 4, 2023, and is incorporated by reference herein in its entirety.

TECHNICAL FIELD

Embodiments are related to integrated circuits. Embodiments are also related to the thermal management of integrated circuits. Embodiments further relate to three-dimensional (3D) integrated circuits including multi-layer 3D stacked integrated circuit (IC) chips. Embodiments also relate to the field of machine learning and support vector regression (SVR).

BACKGROUND

Moore's Law is often referred to by semiconductor industry practitioners as the golden rule of chip development. It has been half a century since Moore's Law was proposed. Moore's Law seems to have entered a bottleneck period. The development of chips has also shifted from pursuing power consumption reduction and performance improvement to more pragmatically meeting market needs. The reason is that, on the one hand, the development speed of memory bandwidth is much lower than the speed of processor logic circuits, so there is a "memory wall" problem. On the other hand, the number of transistors is gradually increasing with the evolving complex architecture of high-performance processors, while advanced semiconductor processes are still expensive and the productivity is not satisfactory. As chips become more and more complex, the contradictions between chip area, yield and complex processes are difficult to reconcile.

The first CPU 4004 released by Intel in 1971 had about 2,300 internal transistors. Five years later, Intel's Ponte Vecchio processor packed 47 chiplets with more than 100 billion transistors into one processor, using 2.5D technology and 3D technology simultaneously in the process.

On Jan. 5, 2022, AMD released the first 3D stacked desktop processor Ryzen 7 5800X3D. Thanks to 3D chip stacking, the average performance of Zen 3 architecture chips has increased by 19% compared to Zen 2 architecture. On Mar. 4, 2022, AI chip company Graphcore's Bow IPU chip uses TSMC's 7-nanometer 3D WOW silicon wafer stacking technology. The AI speed is increased by 40%, while the energy consumption ratio is increased by 16%. On Mar. 9, 2022, Apple released the M1 Ultra, the highest-end processor chip for computers, connecting 2 chips arranged horizontally to each other and equipped with 114 billion transistors. AMD is the first in the industry to use copper-to-copper hybrid bonding and TSV methods to achieve true 3D chiplet stacking, a unique design that consumes less power than existing 3D stacking methods. On Jun. 10, 2022, Intel has also launched a new 3D chip packaging technology called "Foveros". It brings powerful performance and excellent stability to this series of chips.

It can be seen that the 3D stacking technology of chips can continue or even surpass Moore's Law to a certain extent. In this context, chip giants represented by TSMC, Intel, and Samsung are actively exploring 3D packaging technology and other advanced packaging technologies. 2.5D/3D packaging technology is becoming an important means of improving the performance of the chips. The importance of 3D stacking technology is increasing by enabling the highest levels of silicon integration and area efficiency at the lowest cost. Brand new applications are also emerging, the rapid development of 3D stacking technology benefits from its huge demands in artificial intelligence, machine learning, data center and other fields.

3D packaging technology allows different chips such as CPU, accelerator, memory, IO, power management, etc. to be pieced together like Lego blocks, with unparalleled packing density, so that a single package can achieve more functions and interact with peripherals. The area of the device PCB is further reduced.

However, 3D-ICs pose serious design challenges for engineers. Being significantly larger than a single-chip system-on-chip (SoC), 3D-ICs have more components, more integration points, and longer interconnects, which can cause new problems such as high-frequency signal failures, reliability, and other performance issues such as heat build-up risk. The research and technical breakthroughs on thermal management of 3D chips are main focus here.

Memory management, layout planning and task scheduling are the mainstream system-level optimization technologies in thermal sensing 3D chip design.

In terms of optimization of 3D chip architecture, Liu et al. developed a DRAM power saving controller based on 3D stacking technology. The controller is also the interface between the logic layer and the memory layers stacked vertically on top of the logic layer. The global controller scheme of block in and block out is adopted instead of the traditional first-in-first-out (FIFO) method. The special Dynamic Random Access Memory (DRAM) controller design reduces the task execution time, improves the bandwidth utilization rate of 66.89%, and reduces the energy consumption by about 27.18%. Kong et al. proposed two kinds of 3D chip architectures based on monolithic 3D (M3D) integration technology, which reduce the energy consumption of the new architecture by building label array and data array, especially the second architecture, which reduces the energy consumption by 79.1%. Chen and Jha proposed a hybrid architecture of 3D chips that can reduce power consumption. Its basic principle is to vertically stack DRAM layer and Field Programmable Gate Array (FPGA) layer on the CPU layer.

In the study of thermal characteristics of 3D stacked chips, Yavits et al. studied the variation of the peak temperature of 3D chips with an increase of the number of cores and task parallelism and pointed out the adverse factors of high temperature on the scalability of 3D chips. Knechtel et al. tested the peak temperature on two layers of a 3D chip by comparing different benchmarks to reveal the cause of "thermal barrier" and excessive temperature inside the chip.

The early design of 3D chips can be optimized by 3D IC floor planning technology based on thermal aware. The 3D floor planning scheme proposed by Budatocchi et al. is divided into two stages. The first stage uses existing 3D floor planning tools to optimize the chip's package area, total wire length and TSV signal. The second stage conducts a thermal assessment, using an iterative thermal through-the-silicon (TTSV) deployment algorithm to modify the thermal conductivity of regions exhibiting local maximum temperatures.

Experimental results show that the proposed floor planning scheme reduces the peak temperature by 100° K at 0.5% TTSV density. Saha and Sur-Kolay proposed a scheme based on multi objective evolutionary algorithms (MOEA) to perform TSV placement and assignment. The experimental results show that the four objectives of the proposed optimization, namely power density, wire congestion, TSV boundary distance and wire length between layers all meet the design expectations, with a reasonable algorithm convergence time. Jun et al. introduced a 3D thermal test vehicle (TTV) to simulate the real microprocessor composed of logic SRAM or logic chips, tested the influence of the connection gap between the upper and lower chips of TTV on the thermal behavior of TTV, and studied the plane view of the temperature change of heating elements from a plane perspective.

Applying thermal sensing task scheduling of 3D chips, by using thermal size ratio detection technology to allocate appropriate thermal budget for each general core and dedicated core, Cai et al. proposed a synthetic task scheduling scheme for 3D chips that can significantly improve the schedule of tasks and the throughput of the system. The task scheduling scheme proposed by Yin et al. jointly optimizes the energy consumption and throughput of 3D chips by performing thermal-aware task mapping and assigning thermal tasks to cores located on the side of the processor chip, to quickly dissipate the heat generated by the core. On the other hand, the acquisition and release width of processor cores are limited according to the type of the workload, so as to reduce the dynamic power consumption of the cores. Experimental results show that this scheme can reduce energy consumption by 7.6% and improve performance by 0.4%.

Researchers are also considering trying to overcome the interlayer thermal problem in 3D ICs by introducing various materials suitable for eliminating hotspots. Rakesh et al. proposed a fin composed of CNTs (Carbon nanotubes) and a heat dissipation structure facing the direction of the heat source, which can improve the heat accumulation inside the 3D IC. Rakesh et al. also proposed the use of dielectric materials with high thermal conductivity and high temperature capability, such as silicon nitride (Si3N4), alumina (Al2O3), silicon dioxide (SiO2), etc., for effective thermal management of 3D ICs.

Bahiraei et al. conducted a two-phase study on the flow of silver water nanofluids in elliptical needle fin radiators. Under the conditions of different nanoparticle volume fractions, fin density and Reynolds number, adding nanoparticles to the base fluid can have a positive impact on the heat transfer. Feng et al. used different coolants to compare the cooling effects of gradient distribution microneedle fin array (GD-MPFA) and uniform microneedle fin array design (U-MPFA). They found that GD-MPFA design showed the trend of step rise and periodic change of temperature, significantly eliminating the maximum temperature difference.

Low temperature bonding is another key technology to ensure the stacking of chips (or wafers) in 3D integrated circuits. Sun et al. systematically studied the interfacial reactions and microstructural evolution between different substrates (Cu, Ni, Co, Ag, Au, etc.) and interlayer materials (Sn, In, Snln, Ga), discussing the transition to the interlayer materials to add alloys/particles to improve the feasibility of solder joint voids.

The use of microfluidic cooling in 3D chips has also been developed to address the overheating challenges created by the ever-increasing power density of 3D chips. Ansari et al. demonstrated that placing micro-pin fins at hot spots can effectively reduce the maximum temperature of microprocessors. Ding et al. demonstrated that arranging tandem and interleaved micro pin fins within the core area of the chip and adding single-layer baffles in the peripheral area of the chip are effective methods to improve the heat transfer performance of microchannels. Ye et al. introduced embedded microchannels combined with a three-dimensional manifold structure into the silicon body to realize a cooling structure with an integrated microcirculation pump and heat exchanger, which has better cooling performance than air cooling.

The adoption of TSV technology in 3D chip packaging not only endows the chip with the integration capability of the longitudinal dimension, but also it has the shortest electrical transmission path and excellent anti-interference performance. As Moore's Law slowly comes to an end, the miniaturization of semiconductor devices is also increasingly dependent on advanced packaging that integrates TSVs. Rao et al. simplified the method of extracting the equivalent thermal conductivity of the 3D IC model, which significantly reduced the computational time. For different TSV geometries such as cylindrical, quadrilateral, elliptical, and triangular, Jeong et al. studied to determine the ideal shape to improve electrical signal transmission and improve mechanical reliability. The results show that the quadrilateral shape combines the best electrical performance and mechanical reliability, and the cylindrical shape provides better mechanical reliability.

As mentioned above, 3D stacked packaging is becoming a catalyst for chip innovation. Many related advanced technologies, such as flip-chip, TSV, bump, wafer-level packaging, 3D packaging, are gradually applied in the heterogeneous integration of 3D chips. Many researchers have begun to try to use artificial intelligence technology to solve the thermal management and reliability challenges caused by the high integration of 3D chips.

Nair R K developed deep neural network algorithms to detect faulty TSVs and optimize rerouting, the delay and temperature of the chip's internal signals were improved. Hsu et al. combined convolutional neural network (CNN)-based AI deep learning to conduct X-ray tomography images of 3D chips for non-destructive analysis of solder interconnects. Artificial intelligence can quickly detect and predict solder joint interconnect operation failures based on non-destructive 3D X-ray tomography images with an accuracy rate of up to 89.9%. Pandiaraj et al. proposed an efficient Machine Learning (ML) model (linear regression model) to achieve optimized TSV layer assignment, performance analysis of the data showed that TSV assignment based on efficient linear regression model (ELRM) achieved better wire length and temperature.

Kumar et al. developed a fast transient pyrolysis method for 3D integrated circuits based on local, intermediate and global transient response curves using the trained ML decay surface predictor for calculation. This method saves a lot of thermal analysis run time compared to CFD/FEA based tools. Rangarajan et al. proposed an optimal placement algorithm for a three-layer 3D integrated circuit with three core hotspot regions per layer. The algorithm combines Latin hypercube sampling algorithm, genetic algorithm and supervised machine learning based artificial neural network which helps not only to reduce thermal interaction uniformity through thermal diffusion but also to improve temperature uniformity through thermal diffusion. Radmard et al. investigated a cooling device with micro-pin fins directly attached to a chip surface, a novel packaging technology, and used a combination of artificial neural network (ANN) and elite NSGA-II for structure optimization, demonstrating that their solution has great potential for chip heterogeneous integration (HI) applications.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the embodiments to provide for methods and systems for temperature management of multi-layer IC chips including chiplets and three-dimensional (3D) IC chips.

It is another aspect of the embodiments to provide for an improved 3D integrated circuit based on a multi-layer structure that includes vertically stacked semiconductor layers.

It is also an aspect of the embodiments to provide for a 3D IC chip package with multi-layer structure that can include a group of processor cores distributed across semiconductor layers.

It also an aspect of the embodiments to provide for a multi-layer structure including Through Silicon Vias (TSVs) arranged within the layers to facilitate electrical connections between the layers.

It a further aspect of the embodiments to provide for the application of machine to the thermal management of advanced packaging technologies for 3D IC chips.

It is a further aspect of the embodiments to provide for a machine learning method, system and apparatus that includes prediction capabilities including a dataset storage unit for storing thermal simulation data and associated parameters of the 3D IC chip, including power distribution, processor core location distribution, and TSV distribution.

It is also an aspect of the embodiments to provide for a machine learning method, system and apparatus that can utilize a K-fold Cross Validation (K-CV) algorithm configured to train a prediction model using the stored thermal simulation data.

It is also an aspect of the embodiments to provide for a machine learning method, system and apparatus that includes a Support Vector Regression (SVR) algorithm integrated within a prediction model.

It is a further aspect of the embodiments to provide for a prediction module that can apply a trained model to predict hotspot temperatures of the 3D IC chip for configurations with variable layers and parameters, including chips with a greater number of layers, wherein the model achieves a prediction deviation of less than 0.2% from simulated numerical data.

The aforementioned aspects and other objectives and advantages can now be achieved as described herein.

This section to be completed later In an embodiment, a method for fast prediction of hotspot temperatures in three-dimensional (3D) integrated circuit (IC) chips, can involve: inputting a dataset comprising thermal simulation data and associated parameters for 3D IC chips, wherein the dataset includes variables such as, for example, power distribution, processor core location distribution, and Through Silicon Via (TSV) distribution; applying a K-fold Cross Validation (K-CV) algorithm to train a machine learning model using the inputted dataset, wherein the K-CV algorithm is employed to optimize the training process and prevent overfitting; utilizing a Support Vector Regression (SVR) algorithm within the trained machine learning model to predict hotspot temperatures of the 3D IC chips; and adjusting a cooling strategy for cooling the 3D IC chips, in response to monitoring the hotspot temperatures via the trained machine learning model.

An embodiment of the method can further involve applying the trained model to predict hotspot temperatures for 3D IC chips with variable layers and parameters.

In an embodiment, the SVR algorithm can be configured to predict temperature variations corresponding to changes in external cooling strategies, wherein the effect of such changes is modeled as a linear relationship.

In an embodiment, the SVR algorithm can be configured to predict temperature variations corresponding to random TSV distributions, wherein the effect of such changes is modeled as a nonlinear relationship.

In an embodiment, the SVR algorithm can be configured to: predict temperature variations corresponding to changes in external cooling strategies, wherein the effect of such changes is modeled as a linear relationship; and predict temperature variations corresponding to random TSV distributions, wherein the effect of such changes is modeled as a nonlinear relationship.

In an embodiment, a three dimensional (3D) integrated circuit (IC) chip, can include a multi-layer structure comprising a plurality of vertically stacked semiconductor layers, wherein the multi-layer structure includes: a plurality of processor cores distributed across the semiconductor layers, and a plurality of Through Silicon Vias (TSVs) arranged within the layers to facilitate electrical connections between the layers, wherein the 3D IC chip is optimized for thermal management based on a predictive model, enabling effective temperature control when utilized with a thermal management system that monitors and adjusts a cooling strategy of the 3D IC chip.

In an embodiment of the 3D IC chip, a machine learning prediction module can include the predictive module and the machine learning prediction module can comprise a dataset storage unit for storing thermal simulation data and associated parameters of the 3D IC chip, including power distribution, processor core location distribution, and TSV distribution.

In an embodiment of the 3D IC chip, the machine learning prediction module can comprise a Support Vector Regression (SVR) algorithm integrated within the prediction model, the SVR algorithm can be configured to predict hotspot temperatures based on changes in the cooling strategy and a relationship thereof can be modeled as linear.

In an embodiment of the 3D IC chip, the 3D IC chip can comprise a 3D stack chip.

In an embodiment of the 3D IC chip, the 3D chip stack structure can include an interposer that can integrate multiple chips including at least one of a CPU, a memory, or an ASIC into one package module.

In an embodiment of the 3D IC chip, the interposer can comprise a silicon interposer.

An embodiment of the 3D IC chip can further include a heat sink, wherein a contact area between the package module and the heat sink is smaller than a surface area of the heat sink.

In an embodiment of the 3D IC chip, the machine learning prediction module can include a trained model that can predict hotspot temperatures of the 3D IC chip for configurations with variable layers and parameters.

In an embodiment, the machine learning prediction module can comprise a Support Vector Regression (SVR) algorithm integrated within the prediction model, the SVR algorithm configured to predict hotspot temperatures based on variations the TSV distribution, wherein a relationship thereof is modeled as nonlinear.--

In an embodiment, a three dimensional (3D) integrated circuit (IC) chip can include a multi-layer structure comprising a group of vertically stacked semiconductor layers. The multi-layer structure can include a group of processor cores distributed across the semiconductor layers, and a group of Through Silicon Vias (TSVs) arranged within the layers to facilitate electrical connections between the layers. The 3D IC chip can be optimized for thermal management based on a predictive model, enabling effective temperature control when utilized with a thermal management system that monitors and adjusts a cooling strategy of the 3D IC chip.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 9A and FIG. 9B illustrate different CPU distributions in accordance with an embodiment;

FIG. 10A and FIG. 10B illustrate a comparison of results of random core locations of 4-layer 3D chips based on machine learning algorithms;

FIG. 12A illustrates a TIM layer with bump along the x and z directions, in accordance with an embodiment;

FIG. 12B illustrates a die with TSV along the x and z directions, in accordance with an embodiment;

FIG. 13 illustrates a schematic diagram depicting the classification of different global meshing of random TSV distributions for 3D chips, in accordance with an embodiment;

DETAILED DESCRIPTION

Figure 1:
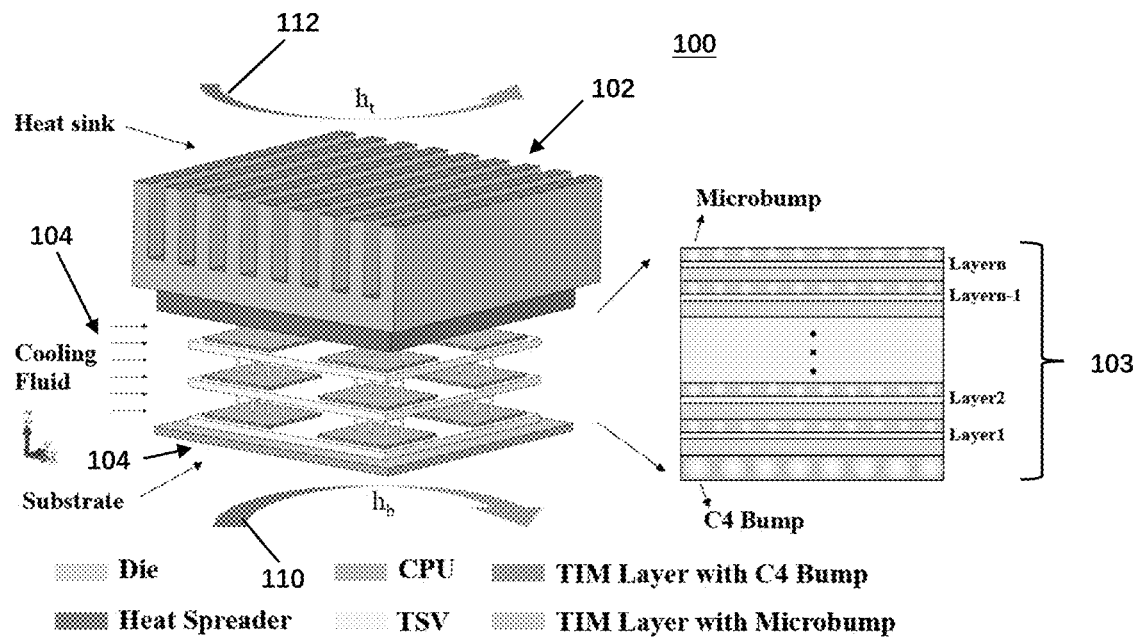
FIG. 1 illustrates a schematic diagram of a 3D chip package, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part. In addition, identical reference numerals utilized herein with respect to the drawings can refer to identical or similar parts or components.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present inventors have comprehensively investigated the effects of geometric and thermal properties of multilayer nominal three-dimensional chip on the temperature hotspots. Based on computational fluid dynamics and heat transfer analysis, various effective parameters which correlate with reducing the hotspot temperature are studied. The present inventors have provided for a detailed and thorough analysis of a multi-layer nominal 3D chip with different geometrics and thermal properties and extended the convective heat transfer model of the 3D chip to 18 layers.

In a 3D IC chip (also referred to as a 3D IC), the signal transmission of the integrated circuit can be improved through TSV, and the interconnection delay is also reduced, but the addition of TSV effects on the heat dissipation problem of the composite material cannot be ignored. The heat transfer analysis of porous medium two-phase composites, combined with thermal resistance analysis theory were considered in these works. The present inventors have proposed a method to accurately calculate the effective thermal conductivity of thermal interface material (TIM) layers inside a multilayer 3D chip with TSV. In addition, other approaches have proved that optimized heat pipes/heat spreader and integrated microchannel structures can effectively reduce the maximum temperature of 3D ICs.

The embodiments relate to the complexity of analyzing the hotspot temperature of 3D IC. A goal is to generate efficient analysis methods for 3D ICs with different power allocation, different CPU core layouts and different TSV layouts, so as to minimize modeling and calculation time. Due to the high integration of 3D chips, the layout of hot core and TSV for each stack is uncertain. The above cited literature has all carried out thermal management and reliability analysis for 3D chips with definite structure. Computational Fluid Dynamics (CFD) modeling (finite element analysis), active/passive cooling strategy and artificial intelligence algorithm play an important role in these works. However, almost all the scheduling or optimization algorithms mentioned in the literature ignore this point, that is, thermal analysis can only be conducted once for a 3D stack chip with one or a specific structure. As will be demonstrated by what follows, adopting a combination of finite element simulation and machine learning, can significantly reduce the modeling time for 3D ICs with different internal structures and the difficulty of obtaining hotspot temperature data As an introduction to the embodiments, we introduce the recent and future development trends of 3D chips. Next, we describe different research ideas to solve the thermal management problems of 3D chips and cite relevant literature to illustrate a role that can be played by artificial intelligence techniques in optimizing chip thermal management. Our previous research results are synthesized to come up with the advantages of the machine learning prediction algorithm used in this paper. In the next section we explain how the 3D chip was modeled in the preceding study and the source of the dataset used for the algorithms studied in this paper. Afterwards, we describe the principles of SVR based machine learning method and how the algorithm is used in this paper to predict the hotspot temperature of 3D chips with three different internal structures (random power allocation, random CPU core location, random TSV distribution). Finally, the previous 3D chip model can be used to verify the accuracy of the predictions of the proposed algorithm, while applying the algorithm to predict the thermal characteristics of higher layer 3D chips and demonstrating that the results are extremely close to the simulation results.

FIG. 1 illustrates a schematic diagram of a 3D IC chip package 100, which may be implemented in accordance with an embodiment. FIG. 1 depicts the structure of the 3D chip package, where the I/O pin can be connected to the solder ball (C4 bump) through a metal redistribution line. The number of solder balls is consistent with the number of I/O pins. To illustrate the internal structure, the 3D chip packaging structure of the 3D IC chip package 100 can be divided into several parts. A heat sink 102 is shown in FIG. 1 with respect to a substrate 106 and components situated therebetween. A cooling fluid 104 shown on the left side of the illustration in FIG. 1 indicated by a group of arrow indicates the direction of flow of the cooling fluid 104. The right side of FIG. 1 indicates an arrangements of Layers (e.g., Layer1, Layer2 . . . . Layern-1, Layern) with respect to microbump(s) and C4 bump.

The dies can be closely stacked between the radiator and the substrate 106. The silicon chips in the middle layer can be bonded together by thermal grease. Heterogeneous integrated CPU processors and other chips can be distributed among them. Embedded stacked layers are displayed in a larger view. Geometric parameters have an important influence on the heat dissipation of 3D chip packages. A complex structure demands a great deal of calculations with respect to the numerical analysis and finite element simulation.

In the 3D chip stack structure discussed herein, a silicon interposer can integrate multiple chips, such as (Central Processing Unit) CPU, memory, (Application Specific Integrated Circuit) ASIC, into one package module. TSV technology can be required for both the vertical interconnection between components and the internal heat dissipation design of the chip. TSV not only endows the chip with the capability of vertical integration, but also has the shortest electrical transmission path and excellent anti-interference performance.

TSV in FIG. 1 is mainly thermal TSV, which is designed to optimize the thermal aggregation effect inside the chip. The entire 3D chip package 100 can be cooled by a coolant such as the cooling fluid 104 shown in FIG. 1. The contact area between the package and the heat sink 102 can be much smaller than the surface area of the heat sink. The ratio of the convective heat transfer coefficient of the heat sink surface to the bottom of the chip substrate is 40 ($h_t/h_b$=40). The curved arrow 112 shown in FIG. 1 relates to $h_t$ and the curved arrow 110 shown in FIG. 1 relates to $h_b$. The geometric parameters related to 3D chip models have been elaborated and explained in previous research work by the present inventor(s).

For the heat transfer and fluid flow simulation of 3D IC chip, based on the steady-state heat transfer analysis, the internal and external heat conduction of the stacked chip package is governed by:

$$\frac{\partial^2 \Theta_s^*}{\partial x^{*2}} + \frac{\partial^2 \Theta_s^*}{\partial y^{*2}} + \frac{\partial^2 \Theta_s^*}{\partial z^{*2}} + \dot{q}_g^* = 0 \quad (1)$$

Where $\dot{q}_g^*$ indicates the non-dimensional volumetric heat generation in the processor and $\Theta_s^*$ is the dimensionless temperature of the solid. The non-dimensional temperature and coordinates are defined as:

$$x^* = \frac{x}{H} \quad y^* = \frac{y}{H} \quad z^* = \frac{z}{H} \quad \Theta^* = \frac{T - T_e}{qH/k_f} \quad (2)$$

where H is the height of 3D IC package 100 (excluding the heat sink 102). The convective cooling based on the side, top and bottom surfaces of the 3D chip were utilized in our prior study. The bottom of the chip substrate 106 can be cooled by natural convection, while the top can be cooled by forced convection. Their nominal convection coefficients are $h_b$=10 W/(m²K) and $h_t$=400 W/(m²K). The boundary conditions for convection can be expressed in the following manner:

$$\frac{\partial \Theta_s^*}{\partial n_v} = -Bi \cdot \Theta_s^* \quad (3)$$

Where $n_v$ is the normal coordinate, and Bi is the dimensionless Biot number defined as:

$$Bi = \frac{hL_c}{k_s} \quad (4)$$

The dimensionless Navier-Stokes equations is utilized for typical fluid flow and steady-state heat transfer analysis:
Mass Conservation:

$$\frac{\partial u^*}{\partial x^*} + \frac{\partial v^*}{\partial y^*} + \frac{\partial w^*}{\partial z^*} = 0 \quad (5)$$

X-Momentum Conservation $$Re_H\left(u^*\frac{\partial u^*}{\partial x^*} + v^*\frac{\partial u^*}{\partial y^*} + w^*\frac{\partial u^*}{\partial z^*}\right) = -\frac{\partial p^*}{\partial x^*} + \left(\frac{\partial^2 u^*}{\partial x^{*2}} + \frac{\partial^2 u^*}{\partial y^{*2}} + \frac{\partial^2 u^*}{\partial z^{*2}}\right) \quad (6)$$

Y-Momentum Conservation $$Re_H\left(u^*\frac{\partial v^*}{\partial x^*} + v^*\frac{\partial v^*}{\partial y^*} + w^*\frac{\partial v^*}{\partial z^*}\right) = -\frac{\partial p^*}{\partial y^*} + \left(\frac{\partial^2 v^*}{\partial x^{*2}} + \frac{\partial^2 v^*}{\partial y^{*2}} + \frac{\partial^2 v^*}{\partial z^{*2}}\right) \quad (7)$$

Z-Momentum Conservation $$Re_H\left(u^*\frac{\partial w^*}{\partial x^*} + v^*\frac{\partial w^*}{\partial y^*} + w^*\frac{\partial w^*}{\partial z^*}\right) = -\frac{\partial p^*}{\partial z^*} + \left(\frac{\partial^2 w^*}{\partial x^{*2}} + \frac{\partial^2 w^*}{\partial y^{*2}} + \frac{\partial^2 w^*}{\partial z^{*2}}\right) \quad (8)$$

Energy Conservation for the Fluid Domain $$Pe_H\left(u^*\frac{\partial \Theta_f^*}{\partial x^*} + v^*\frac{\partial \Theta_f^*}{\partial y^*} + w^*\frac{\partial \Theta_f^*}{\partial z^*}\right) = \frac{\partial^2 \Theta_f^*}{\partial x^{*2}} + \frac{\partial^2 \Theta_f^*}{\partial y^{*2}} + \frac{\partial^2 \Theta_f^*}{\partial z^{*2}} \quad (9)$$

Where $\Theta_f^*$ is the dimensionless temperature of the fluid, and u*, v*, w* are the x, y and z components of the dimensionless velocity respectively.

$$u^* = \frac{u}{u_m}, v^* = \frac{v}{u_m}, w^* = \frac{w}{u_m}, p^* = \frac{pH}{\mu_f u_m}, \quad (10)$$

$$Re_H = \frac{\rho_f u_m H}{\mu_f}, Pe_H = \frac{\rho_f c_p u_m H}{k_f}$$

The mean velocity is given by $u_m = H^{-1}\int_0^H u(x, y) \, dx \, dy$ and p* is the dimensionless pressure, $\mu_f$ the dynamic viscosity, $c_p$ the specific heat at constant pressure, $Re_H$ the Reynolds number, and $Pe_H$ the Péclet Number. Under the assumption of ignoring the temperature gradient and cooling fluid flowing out at standard atmospheric pressure ($p_0$), the outlet boundary condition is set as $$p_0 = 1 \text{ atm}, \frac{\partial \Theta_f^*}{\partial x^*} = 0 \quad (11)$$

For all n-layer (n represents the number of chip layers) stacked chips in this work, 4 processors are distributed on each layer, the nominal thermal power of each processor in a 3 layer chip is 90/12=7.5 (W), which results in a total power of 90 W on the chip. The power settings of each layer of stacked chips higher than 3 layers will be described in detail below, the amount of power allocated to each layer also varies as the simulation parameters change.

Figure 2A:
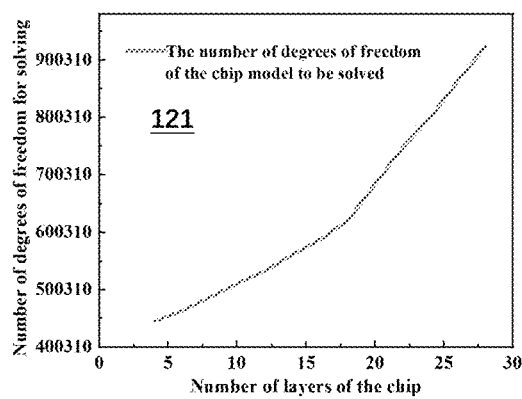
FIG. 2A and FIG. 2B illustrate graphs 121 and 123 respectively depicting a comparison of the number of the number of degrees of freedom of the chip models to be solved, and a comparison of the time required for multi-layer chip solving, in accordance with an embodiment.
Figure 2B:
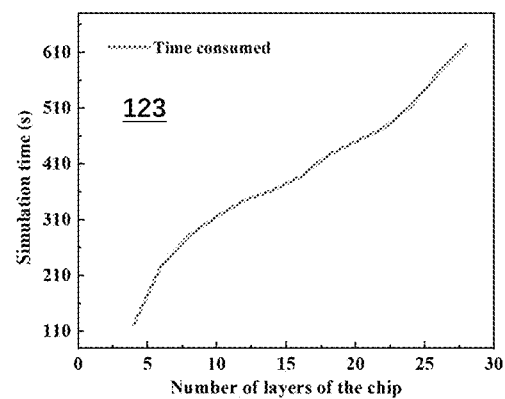

FIG. 2A and FIG. 2B illustrate graphs 121 and 123 respectively depicting a comparison of the number of the number of degrees of freedom of the chip models to be solved, and a comparison of the time required for multi-layer chip solving, in accordance with an embodiment. A comparison of the number of resources required to simulate the 4-28-layer 3D stacked chip is indicated by FIG. 2A and FIG. 2B. The simulation platform uses Intel Xeon CPU E3-1281 3.7 GHZ and 16 GB RAM. The simulation software uses the multi-physics field finite element simulation software COMSOL.

As shown in graph 121 of FIG. 2A the number of degrees of freedom of each layer of 3D chip model to be solved will no longer increase linearly but exponentially after the number of layers increases to 16. Graph 123 of FIG. 2B also illustrates that the time for solving the 4-16-layer chip model grows slowly, but for solving the model above 16 layers, the time consumed will also increase exponentially. This is due to the increasing complexity and difficulty of solving chip models with more than 16 layers that machine learning algorithms need to be introduced to help solve the thermal management problem for 3D chips with variable parameters. However, it is still necessary to obtain a certain number of training sets based on the finite element solution model. A basic flow diagram for this simulation or methodology is shown in FIG. 3.

Figure 3:
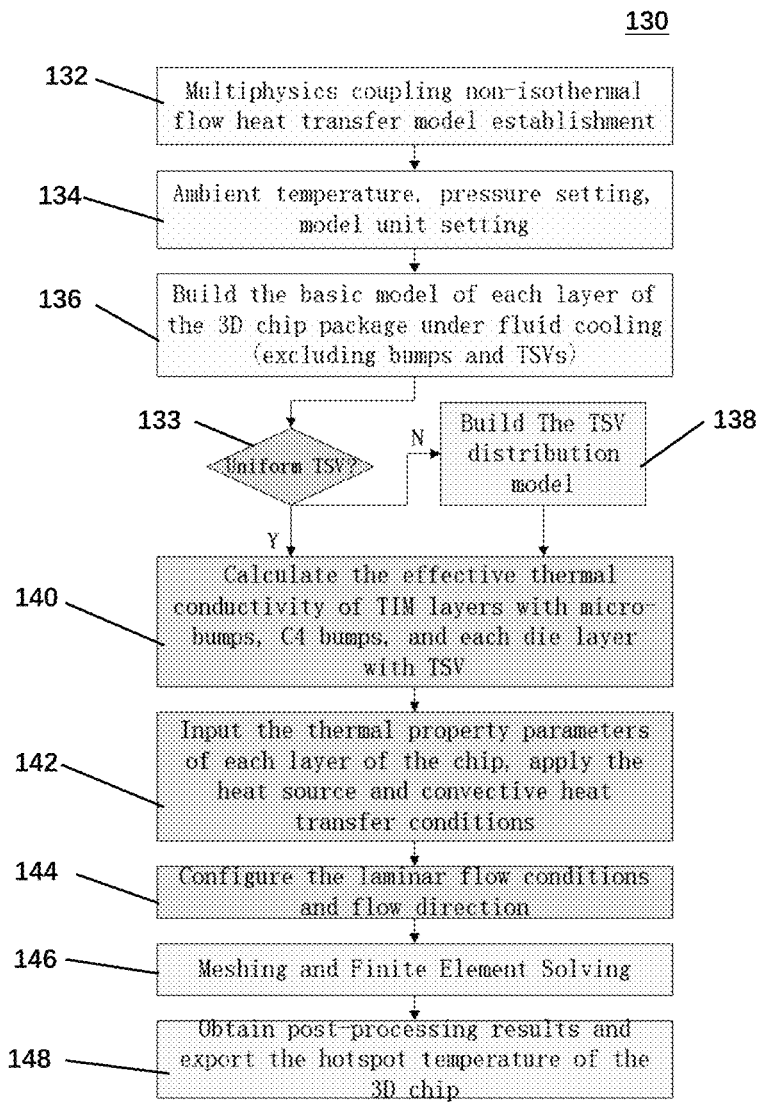
FIG. 3 illustrates a flow diagram of a method for implementing a finite element model for obtaining the hotspot temperature of a multi-layer 3D chip, in accordance with an embodiment.

FIG. 3 illustrates a flow diagram of a method 123 for implementing a finite element model for obtaining the hotspot temperature of a multi-layer 3D chip such as the 3D chip package 100 shown in FIG. 1, in accordance with an embodiment. As indicated at block 132, a step or operation can be implemented in which a multi-physical field coupled non-isothermal heat transfer model can be established. Next, as shown at block 134, a step or operation can be implemented involving the ambient temperature, the pressure setting and model unit setting. Then, as depicted at block 136, a step or operation can be implemented to build the basic model of each layer of the 3D chip package 100 under fluid cooling (excluding bumps and TSVs). Then, as indicated at decision block 133, a test can be performed to determine if a uniform TSV is available. If so, then as shown at block 138, the TSV distribution model can be constructed.

Thereafter, as shown at block 140, a step or operation can be implemented to calculate the effective thermal conductivity of TIM layers with micro-bumps, C4 bumps, and each die layer with TSV. Then, as illustrated at block 142, a step or operation can be implemented to input the thermal property parameters of each layer of the chips and apply the heat source and convective heat transfer conditions. Next, as shown at block 144, a step or operation can be implemented to configure the laminar flow conditions and the flow direction. Then, a step or operation can be implemented involving meshing and finite element solving. Finally, a step or operation can be implemented to obtain post-processing results and export the hotspot temperature of the 3D IC chip.

Thus, after setting up the simulation environment and cooling environment parameters, the basic model for each layer of the 3D chip can be constructed one by one according to the effective thermal conductivity and a finite element method. The effective thermal conductivity of the micro-bump, C4-bump, thermal interface material (TIM) layer and die layer containing TSV can be calculated based on the thermophysical properties and the thermal resistance method. Next, the thermal performance parameters of each layer of the chip are entered, the heat source and convective heat transfer conditions are applied, and the laminar flow conditions and flow directions are configured. Finally, the solution is calculated to obtain the value of the hotspot temperature of the chip and the heat distribution inside the chip.

Regarding the training process of such a model (e.g., ML Model), the influence of geometric and thermal characteristics of 3D chips on the temperature hotspots, and various effective parameters related to reducing the temperature of hotspots were investigated in Wang et. al. The present inventor(s) previous research expanded the thermal analysis model of heterogeneous integrated 3D chips to 18 layers and analyzed the trend of hotspot temperature of chip packages exposed to variable Reynolds number cooling fluid. But the simulation model can only analyze the internal heat flow of one form of 3D stacked die. For example, the fixed processor distribution for each layer, the fixed power distribution for each layer, and the fixed TSV distribution.

Once the structure changes, the model may need to manually adjust the parameters and re-simulate. It is not possible to obtain hotspot temperature data for a large number of 3D stacked chips with different structures at one time. In the disclosed embodiment, however, a machine learning technology method can be adopted, to obtain multiple groups of hotspot temperature data of the 3D chips with different structures by using fewer simulation data samples. This can greatly improve the utilization efficiency of modeling and analysis.

For the hotspot temperature data obtained from the 3D chip heat transfer analysis model 1, data collection and training will be very time-consuming. Among many machine learning algorithms, the Support vector machine (SVM) model supports the classification and prediction of small samples and is easy to generalize. The flow diagram of the algorithm that combines the simulation to obtain the required sample data is shown in FIG. 4.

Figure 4:
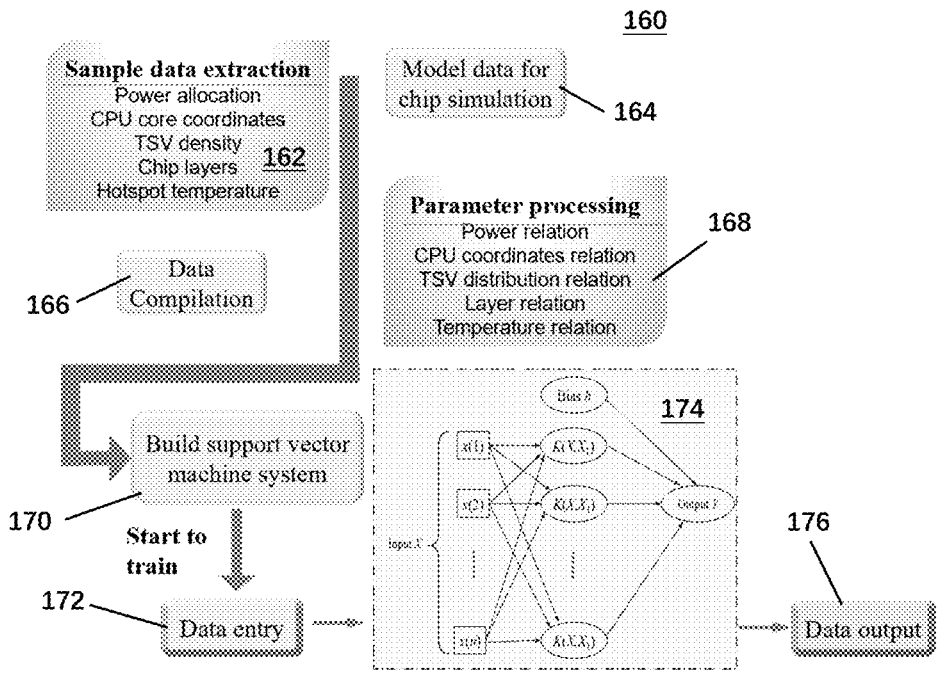
FIG. 4 illustrates a flow diagram depicting the overall design process of a machine learning prediction method, which may be implemented in accordance with an embodiment.

FIG. 4 illustrates a flow diagram depicting the overall design process of a machine learning prediction method 160, which may be implemented in accordance with an embodiment. As shown at block 162, a sample data extraction operation can be implemented to obtain data associated with, for example, power allocation, CPU core coordinates, TSV density, chip layers, and hotspot temperature. Data can be modeled for chip simulation as indicated at block 164. Data compilation can also be implemented as shown at block 166. Parameter processing, as shown at block 168, can involve processing of parameters related to, for example, power relation, CPU coordinates relation, TSV distribution relation, layer relation, and temperature relation. An operation can be then implemented to build the support vector machine system. Then, training can begin including data entry as shown at block 172 with respect to machine learning operations 174, followed by data output as shown at block 176.

After preprocessing and normalizing the data, the problem can be set as a SVR problem, and the optimization function of the model can be written as:

$$\min_{\omega,\beta} \frac{1}{2}\|\omega\|^2 + C\sum_{j=1}^{\hat{n}} l_\varepsilon(f(x_i) - y_i) \qquad (12)$$

where $\omega$ is the coefficient of the support vector in the decision function, $\beta$ is the constant term in the decision function, $\hat{n}$ the number of samples and C is the regularization constant (penalty coefficient). The expression for $l_\varepsilon$ is:

$$l_\varepsilon(z) = \begin{cases} 0, & \text{if } |z| < \varepsilon, \\ |z| - \varepsilon, & \text{otherwise} \end{cases} \qquad (13)$$

Where $\varepsilon$ is tolerance deviation. The decision function for this problem is as follows:

$$f(x) = \sum_{i=1}^{m}(\alpha_i^* - \alpha_i)x_i^T x + \beta \qquad (14)$$

The sample of $(\alpha_i^*-\alpha_i)\neq 0$ in the above formula can be the support vector of SVR, and $\alpha_i^*$ and $\alpha_i$ are the Lagrange multipliers. After obtaining $\alpha_i$, if $0<\alpha_i<C$, The expression for b is:

$$f(x) = \sum_{i=1}^{m}(\alpha_i^* - \alpha_i)\phi(x_i)^T\phi(x_i) + \beta \tag{15}$$

Introducing the kernel trick, to replace x with the kernel function $\phi(x)$, the final model is obtained as:

$$f(x) = \sum_{i=1}^{m}(\alpha_i^* - \alpha_i)\phi(x_i)^T\phi(x_i) + \beta \tag{16}$$

The kernel function that maps this problem to a high-dimensional feature space is the Radial Basis Function (RBF) function. The parameters that need to be set are c (penalty coefficient) and g (gamma function), The specific expression of the RBF kernel function $K(x_i, x_j)$ is:

$$K(x_i, x_j) = e^{-\frac{1}{2\sigma^2}\|x_i - x_j\|^2} \tag{17}$$

where $\sigma$ is the width coefficient of the RBF kernel function, set here:

$$\text{gamma}(\gamma) = \frac{1}{2\sigma^2} \tag{18}$$

The SVR algorithm can be used to optimize the parameters and verify the performance of the classifier to achieve the best prediction effect. The cross-validation statistical analysis method can be used here to verify the performance of the classifier. Common CV methods mainly includes Hold-Out Method, K-fold Cross Validation (K-CV) and Leave-One-Out Cross Validation (LOO-CV):

The Hold-Out method does not achieve cross-training, and LOO-CV is computationally time-consuming and inefficient. k-CV method is moderately computationally intensive and the final results are more convincing. Other relevant parameter settings are shown in Table 1, where the parameter v indicates the use of the 5-fold CV method

TABLE 1

Parameters to be set for SVR regression algorithm

|   | Role of parameter | Default Value | Optimization value |
|---|---|---|---|
| c | parameter of Epsilon-SVR (loss function) | 1 | obtained by the K-CV algorithm |
| g | Setting of gamma function in kernel function | 1/num features | obtained by the K-CV algorithm |
| v | Number of n's in n-fold cross-validation | 5 | 3 |
| p | tolerance deviation $\varepsilon$ | 0.1 | 0.01 |

The K-CV algorithm can be used to determine the optimal solutions for the two parameters c, g. The basic design idea of the algorithm is the original data are divided into k groups, where the classification accuracy is continuously cross-validated for the k−1 group training set and the 1 group validation set, and the corresponding c and g with the highest classification accuracy are obtained as the best parameters. If the most classification accuracy is repeated, the group corresponding to the smallest c is selected as to improve the generalization ability of the classifier.

In order to verify the closeness of the predicted model with the actual model (simulation model) and the closeness of the predicted values to the true values of the sample, the range of predicted model parameters needs to be further extended and the following corresponding evaluation indexes are listed.

i) MAE

Mean absolute error (MAE) can be used to reflect the true error between the actual value and the predicted value.

$$MAE = \frac{1}{n}\sum_{i=1}^{n}|\hat{y}_i - y_i| \tag{19}$$

ii) MSE

MSE is a statistical measure and loss function commonly used in ML regression models. MSE is commonly used to measure how well the predicted value $\hat{y}$ matches some true value. In this work, MSE is used to validate how close the prediction $\hat{y}$ of the model obtained by this algorithm is to the true label y.

$$MSE = \frac{1}{n}\sum_{i=1}^{n}(y_i - \hat{y}_i)^2 \tag{20}$$

where n is the sample size, i the sample number, $\hat{y}$ the predicted value, and y is the real value.

iii) Square correlation coefficient ($R^2$)

In the thermal analysis of 3D chips, the change of one variable is often affected by the combination of multiple variables, which requires the use of correlation analysis. The measure of the degree of correlation is the square correlation coefficient in the SVR regression model.

where y is the real value and f(x) is the predicted value. The square correlation coefficient is:

$$R^2 = \frac{\left(n\sum_{i=1}^{n}f(x_i)y_i - \sum_{i=1}^{n}f(x_i)\sum_{i=1}^{n}y_i\right)^2}{\left(n\sum_{j=1}^{n}f(x_i)^2 - \left(\sum_{i=1}^{n}f(x_i)\right)^2\right)\left(n\sum_{i=1}^{n}y_i^2 - \left(\sum_{i=1}^{n}y_i\right)^2\right)} \tag{21}$$

Figure 5:
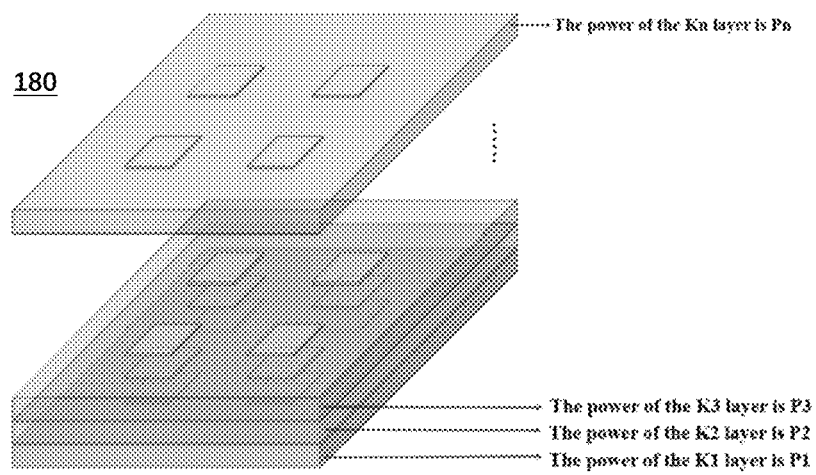
FIG. 5 illustrates a schematic diagram of a power distribution system for power distribution of each layer of 3D stacked chips, in accordance with an embodiment.

FIG. 5 illustrates a schematic diagram of a power distribution system 180 for power distribution of each layer of 3D stacked chips, in accordance with an embodiment. As shown in FIG. 5, in the 3D stacked chip, the layout of the CPU cores of each single-layer chip is the same, as well as the other parameters for each layer. Therefore, the power distribution of the K1 . . . . Kn layers is P1 . . . . Pn. The total power of the 4-layer 3D chip is 90 W. Based on the simulation model setting in FIG. 1, on the basis of the constant total power of the 3D chip, the power of K1 . . . . Kn layers is randomly allocated. Training data is collected in the following ways: the hotspot temperature values of 30 groups of different 3D chips are obtained through the simulation model. The prediction results of the machine learning algorithm based on K-CV cross-validation are compared with the simulation results obtained by the simulation model to verify the accuracy of the prediction of hotspot temperature, as shown in FIG. 6A and FIG. 6B.

Figures 6A, 6B:
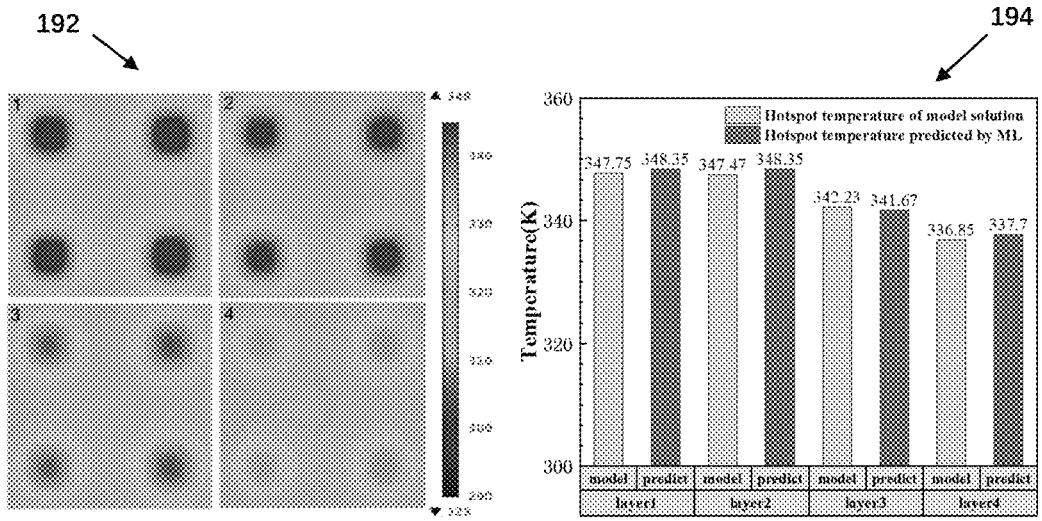
FIG. 6A and FIG. 6B illustrates graphs depicting a comparison of prediction results of random power allocation for 4-layer 3D chips based on machine learning algorithms.

FIG. 6A and FIG. 6B illustrates graphs depicting a comparison of prediction results of random power allocation for 4-layer 3D chips based on machine learning algorithms. FIG. 6A depicts a graph 192 depicting temperature (K) distribution of device layer1-4 of a 3D IC. Graph 194 of FIG. 6B depicts data illustrating a comparison of the hotspot temperature of the model solution and the predicted data solved by machine learning.

To build the SVM model, where the training set attribute matrix (independent variable) train is n×m dimensional where n denotes the number of training samples and m denotes the number of attributes (dimensions). The matrix form of the two data sets is as follows, where P denotes the power allocated to each layer in the training dataset, and T' indicates the hotspot temperature of the whole chip in the training dataset.

$$\text{train\_x} = \begin{bmatrix} P_{11} & P_{12} & P_{13} & P_{14} \\ P_{21} & P_{22} & P_{23} & P_{24} \\ \vdots & \cdots & \cdots & \vdots \\ P_{n1} & P_{n2} & P_{n3} & P_{n4} \end{bmatrix} \tag{22}$$

$$\text{train\_y} = \begin{bmatrix} T'_1 \\ T'_2 \\ \vdots \\ T'_n \end{bmatrix}$$

The test set attribute matrix (independent variable) test is N×m dimensional. N denotes the number of test samples and m denotes the number of attributes (dimensions). The matrix form of the two data sets is as follows, P* denotes the power allocated to each layer in the test dataset, T* indicates the hotspot temperature of the whole chip in the test dataset.

$$\text{test\_x} = \begin{bmatrix} P^*_{11} & P^*_{12} & P^*_{13} & P^*_{1m} \\ P^*_{21} & P^*_{22} & P^*_{23} & P^*_{2m} \\ \vdots & \cdots & \cdots & \vdots \\ P^*_{N1} & P^*_{N2} & P^*_{N3} & P^*_{Nm} \end{bmatrix} \tag{23}$$

$$\text{test\_y} = \begin{bmatrix} T^*_1 \\ T^*_2 \\ \vdots \\ T^*_N \end{bmatrix}$$

The decision function for this example can be represented in the algorithm as follows:

$$f(x) = \sum_{i=1}^{n} (-\alpha + \alpha^*_i) K(x_i, x) + b \tag{24}$$

That is, the algorithmic representation of the predicted value $\hat{y}$ is $$\hat{y} = \text{sgn}\left(\sum_{i=1}^{n} (-\alpha + \alpha^*) \exp(-\text{gamma}\|x_i - x\|^2)\right) + b \tag{25}$$

The sample size is 30. With 28 sets of sample data as the training set and 2 sets of samples as the test set, the prediction set of hotspot temperature of 3D chips can be obtained. The prediction data of the random power distribution of the 8-layer stacked chip is obtained in a similar manner to that of the 4-layer, the total power of the 4-layer 3D chip is also 90 W, with 25 sets of sample data as the training set and 5 sets of samples as the test set, and the hotspot temperature of the 8-layer 3D chip is predicted after training based on the SVR model.

Figure 7:
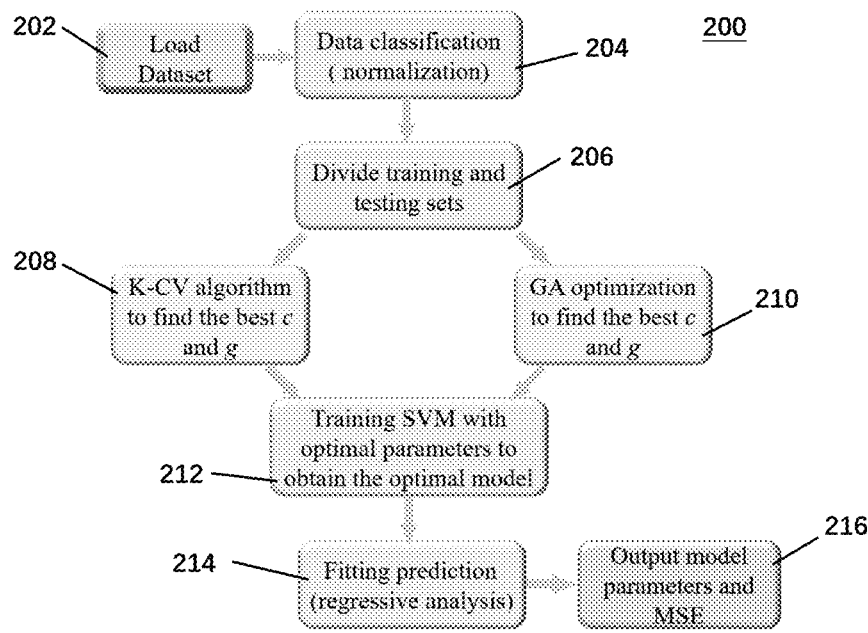
FIG. 7 illustrates a design flow diagram of a method 200 of regression prediction using machine learning, wherein two optimization algorithms can be used to obtain the best parameters (c & g) from a K-CV algorithm as well as genetic algorithm (GA), in accordance with an embodiment.

FIG. 7 illustrates a design flow diagram of a method 200 of regression prediction using machine learning, wherein two optimization algorithms can be used to obtain the best parameters (c & g) from a K-CV algorithm as well as genetic algorithm (GA), in accordance with an embodiment. FIG. 7 therefore illustrates a design flow for regression prediction using machine learning optimization algorithms (K-SV+SVR/GA+SVR).

As shown at block 202, a step or operation can be implemented involving loading of a dataset. Thereafter, as indicated at block 204, a step or operation can be implemented involving data classification (normalization) with respect to the loaded dataset. Thereafter, as shown at block 206, a step or operation can be implemented to divide training and testing sets. Then, as shown at blocks 208 and 210, two approaches can be implemented. That is, as indicated at block 208 a step or operation can be implemented involving running of a K-CV algorithm to find the best c and g. As illustrated at block 210, a step or operation can be implemented involving GA (Genetic Algorithm) optimization to find the c and g. Then, as shown at block 212, a step or operation can be implemented involving training the SVM with optimal parameters to obtain the optimal model. Then, as shown at block 214, a step or operation can be implemented involving a fitting prediction (regressive analysis) followed by, as depicted at block 216, a step or operation involving output model parameters and MSE.

The prediction results can be seen in Table 2, wherein the prediction errors using the two optimization algorithms are similar and are within reasonable limits. However, the computation time of the genetic algorithm is much larger than that of the K-CV algorithm.

TABLE 2

Prediction process parameters and corresponding errors of random power allocation for 4-layer and 8-layer 3D chips

| Algorithm | Layer number | n (training samples number) | N (test samples number) | m (dimensions) | c (loss function) | g (gamma function) | MSE |
|---|---|---|---|---|---|---|---|
| K-CV | 4 | 28 | 2 | 4 | 8 | 0.1767 | 0.0506171 |
|  | 8 | 25 | 5 | 8 | 2.8284 | 0.0884 | 0.0106323 |
| GA | 4 | 28 | 2 | 4 | 0.0103 | 30.6023 | 0.0714741 |
|  | 8 | 25 | 5 | 8 | 9.3043 | 0.1692 | 0.0090556 |

Figure 8A:
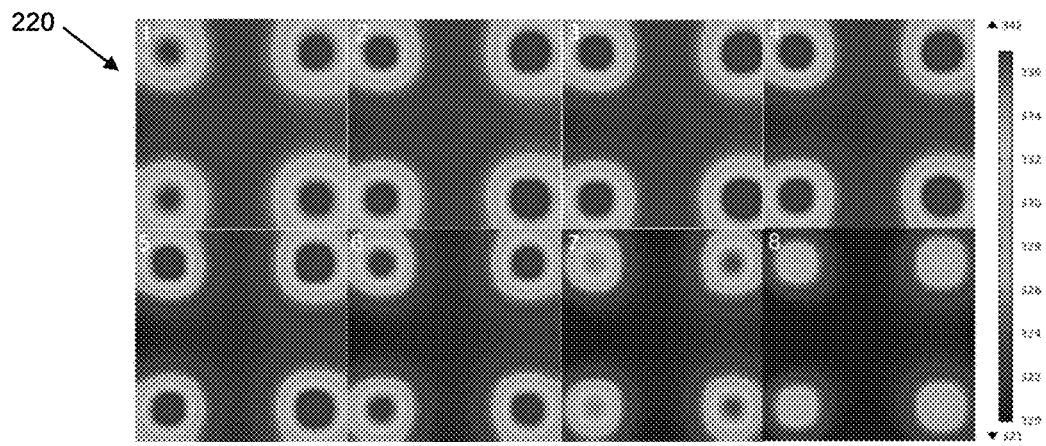
FIG. 8A and FIG. 8B illustrate, respectively, a graph of temperature distribution and a graph of predicted deviation, in accordance with an embodiment.
Figure 8B:
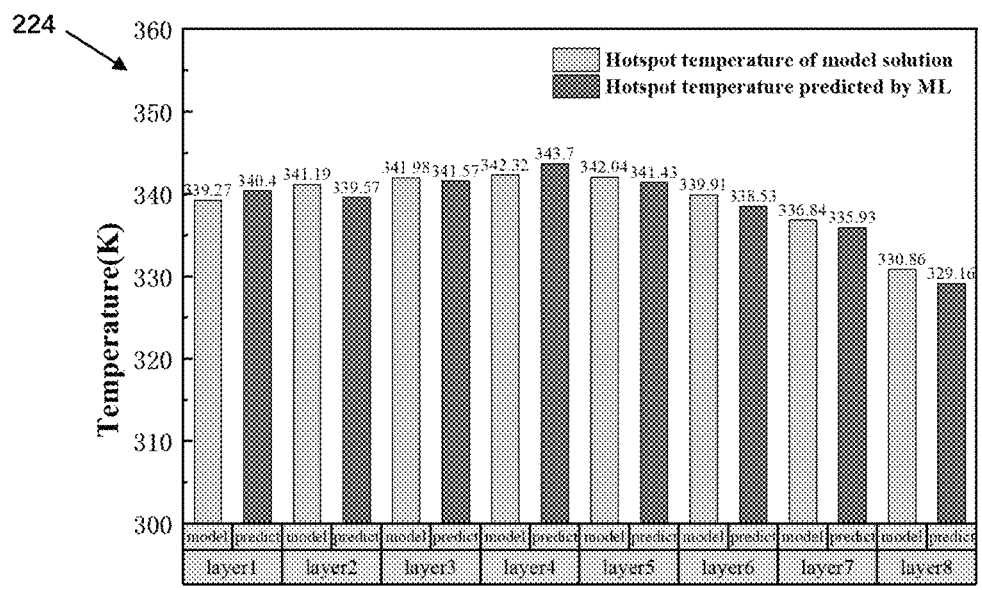

FIG. 8A and FIG. 8B illustrate, respectively, a graph 220 of temperature distribution and a graph 224 of predicted deviation, in accordance with an embodiment. That is, for 8-layer stacked chips, graph 220 of FIG. 8A shows the temperature distribution of hotspots in each layer for one of the predicted samples. Graph 224 of FIG. 8B shows the predicted deviation of the maximum temperature of each layer in the same sample. As can be seen in the figures, the chip layer 4 is farther away from the heat sink and the substrate and the heat gathered is difficult to transfer effectively, therefore, the hotspot temperature appears in the chip layer 4. FIG. 8A and FIG. 8B illustrate data indicative of the comparison of prediction results of random power allocation for 8-layer 3D chips based on machine learning algorithms. FIG. 8A shows temperature (K) distribution of device layer1-8 of 3D IC. FIG. 8B depicts a comparison of the hotspot temperature of the model solution and the predicted data solved by machine learning.

FIG. 9A and FIG. 9B illustrate different CPU distributions 230, 232, and 234 in accordance with an embodiment. In view of the different distribution of CPUs in each layer of the 3D chip (shown FIG. 9A), the die where the CPU Core of the 3D chip is located needs to be divided into 20*20 grids. The center of the Core where the CPU is located determines its coordinates according to its location as shown in FIG. 9B. After data fitting, the dimension of the coordinate data of the chip can be reduced to obtain the sample dataset (reducing the dimensionality of the training set attribute matrix from 8 to 4 dimensions is beneficial to improve the accuracy of the training model).

FIG. 9A and FIG. 9B depict schematic diagrams of random distribution of different CPU cores for 4-layer 3D chips based on machine learning algorithms. FIG. 9A illustrates random distribution CPU cores in device layer1-4 of 3D IC. FIG. 9B illustrates the coordinate position distribution of four Cores in device layer.

Note that dimension reduction data can be obtained by the following formula.

$$f(x, y) = 2x - 30y + 113 \quad (26)$$

where x, y are the two-dimensional plane coordinate position of the area where the chips are located, and the dimension reduction processing results of four chips in each layer are introduced into the SVR model as a training set.

Figure 10B:
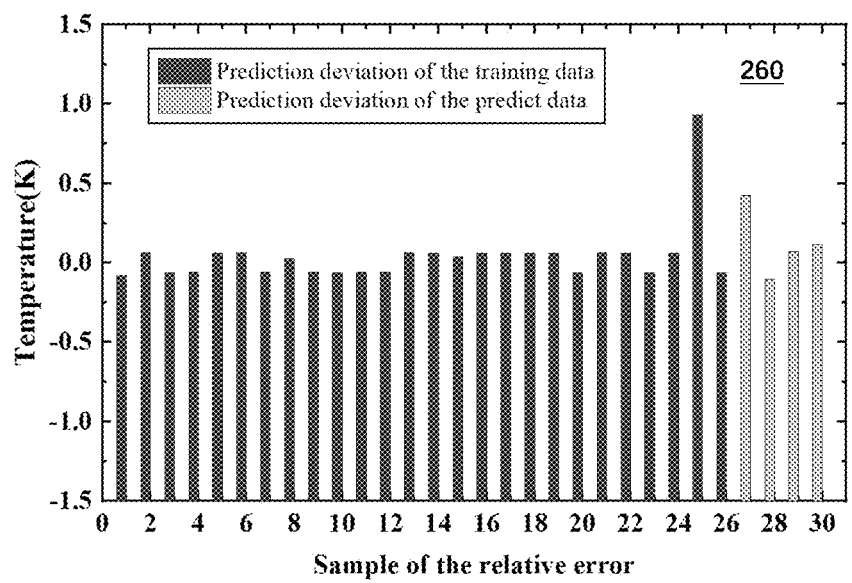

FIG. 10A and FIG. 10B illustrate a comparison of results of random core locations of 4-layer 3D chips based on machine learning algorithms. FIG. 10A shows a comparison of the temperature (K) distribution of the complete chip for the prediction set involving a 4-layer stacked chip as indicated by examples 242, 244, 246, 248, and temperature gradient 250. FIG. 10B shows a graph 260 involving a prediction deviation of the 4-layer 3D chip hotspot temperature for all training sets versus prediction sets.

As shown in FIG. 10A, in a 4-layer stacked chip, the dimensionally reduced randomly distributed CPU data (4 cores are 1 group) can be used as input sample data, with 24 groups of sample data are used as training sets, and 4 sets of samples used as test sets for the hotspot temperature prediction of SVR-based 3D chips. The deviation between the training set and the prediction set shown FIG. 10B is within a reasonable range. Similarly, Table 3 can also draw the same conclusion. The genetic algorithm yields similar prediction errors as the K-CV optimization algorithm but is more time-consuming than the latter.

TABLE 3

Prediction process parameters and corresponding errors of random core locations for 4-layer chips

| Algorithm | Layer number | n (training samples number) | N (test samples number) | m (dimensions) | c (loss function) | g (gamma function) | MSE |
|---|---|---|---|---|---|---|---|
| K-CV | 4 | 24 | 4 | 4 | 2.8284 | 2.8284 | 0.0476282 |
| GA | 4 | 24 | 4 | 4 | 4.2546 | 0.5445 | 0.0636557 |

Figures 11A, 11B:
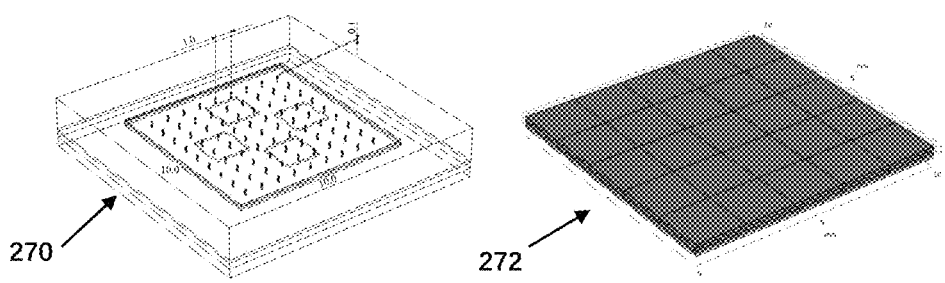
FIG. 11A illustrates geometric parameters of a 3D IC package with uniform TSV.
FIG. 11B illustrates a schematic diagram of mesh division of die layer containing TSV in a 3D chip.

Through Silicon Via (TSV) is the communication path between the layers of 3D ICs and is also an important thermal conduction path. The thermal problems of 3D ICs can be mitigated by a reasonable TSV distribution design. As shown in FIG. 11(a), inside the integrated chip package, uniform TSVs are distributed. 4 CPU cores are distributed in each layer of the multi-layer stacked chip. Ignoring the thinner silica insulation layer, TSVs can be considered as tiny cylinders in a three-dimensional chip structure.

FIG. 11A illustrates geometric parameters of a 3D IC package 270 with uniform TSV. FIG. 11B illustrates a schematic diagram of mesh division 270 of die layer containing TSV in a 3D chip. Changing the number of TSV distributions or the graphical parameters of TSVs can directly affect the heat flow inside the 3D chip, and the hotspot temperature of the chip will change accordingly. The traditional simulation analysis and thermal resistance analysis methods cannot predict the change of the hotspot temperature of the chip under random TSV distribution but can only analyze a few cases such as the Uniform TSV and the Core-Concentrated TSV.

The thermal resistance analysis method based on the thermal simulation model proposed in our previous analysis, combined with the divided plane modeling method proposed in this work, using machine learning algorithms, can solve such problems. As shown in FIG. 11B, the die layer of the 3D stacked chip can be divided into a 25*25 square grid. For each grid area, the corresponding equivalent thermal conductivity is calculated according to the actual TSV distribution. The following is based on a calculation method for a single square grid.

FIG. 12A illustrates a TIM layer with bump along the x and z directions, and FIG. 12B illustrates a die with TSV along the x and z directions, in accordance with an embodiment. The calculation method of the effective thermal conductivity of the TIM layer ($k_{ec}$) follows the formula from our previous study, as shown in FIG. 12(a):

$$k_{ec} = \frac{k_{grease}[\hat{\alpha}(k_{bump} - k_{grease}) + \hat{\gamma}k_{grease}]}{(1 - 1.240\phi^{1/3})[\hat{\alpha}(k_{bump} - k_{grease}) + \hat{\gamma}k_{grease}] + k_{grease}} \quad (27)$$

where $k_{grease}$ is the thermal conductivity of the thermal grease, $k_{bump}$ is the thermal conductivity of the Micro bump and $\phi$ depends on the geometry of the TIM layer, $\phi=\pi a^3/(6b^3)$, $\hat{\alpha}=0.6496\phi^{1/3}$, $\hat{\gamma}=0.806\phi^{-1/3}$.

The calculation method of the effective thermal conductivity of the Die is shown in FIG. 12(b): The effective thermal conductivity for in-plane direction $k_{Die-xy}$ and cross-plane $k_{Die-z}$ can be obtained as follows:

$$k_{Die-z} = \frac{S_{TSV} \times k_{Cu} + (S_{Si} - S_{TSV}) \times k_{Si}}{S_{Si}} \quad (28)$$

where, $S_{Si}=A*B$ and $S_{TSV}=N*\pi*R^2$ represent the horizontal cross-sectional area of Si substrate and TSV, respectively. $k_{Cu}$ and $k_{Si}$ are used to express the thermal conductivity of Cu and Si, respectively. N* represents the number of TSVs.

$$k_{Die-xy} = \frac{B \times k_{xy-m} \times k_{Si}}{c_2 \times k_{Si} + (B - c_2)k_{xy-m}} \quad (29)$$

$$k_{xy-m} = \frac{c_1 \times k_{Cu} + (A - c_1) \times k_{Si}}{A} \quad (30)$$

Where $$c_1 = c_2 = \sqrt{N^* \times \pi \times R^2}. \quad (31)$$

Since typical values for the diameter of thermal TSVs are 10-250 μm, typical values for the pitch of TSVs are 0.2-2 mm. According to the series-parallel thermal resistance theory, combined with thermal conduction analysis, the number of TSVs distributed in a single grid structure of the 3D chip in FIG. 12B can be divided into seven cases: 0, 1, 4, 16, 36, 64, and 100.

As shown in Table 4, according to the above calculation formula of thermal conductivity, the relative thermal conductivity of a single grid structure in the horizontal plane and vertical plane under different TSV distributions is obtained.

TABLE 4

The thermal conductivity calculation table of a single square grid with TSV

| Number of TSVs distributed in the grid | Relative thermal conductivity in the XY plane ([W/(m * K)]) | Relative thermal conductivity in the Z plane ([W/(m * K)]) |
|---|---|---|
| 0 | 130 | 130 |
| 1 | 131.8 | 132 |
| 4 | 136.5 | 138.5 |
| 16 | 153 | 164 |
| 36 | 180.3 | 206.3 |
| 64 | 225 | 265.6 |
| 100 | 305.2 | 342 |

FIG. 13 illustrates a schematic diagram depicting the classification of different global meshing of random TSV distributions for 3D chips, in accordance with an embodiment. The die layer of the model or configuration shown in FIG. 1 can be divided into square grids 290, 292 . . . 294, 296, as shown in FIG. 13. The material properties CAN BE configured for each segmented small plane, focusing on the import of the effective thermal conductivity in the XY plane corresponding to the random TSV distribution as well as in the Z-axis direction, and the finite element analysis is performed for the complete 3D chip. In this way, the training set and the required test set for machine learning are obtained.

Figure 14A:
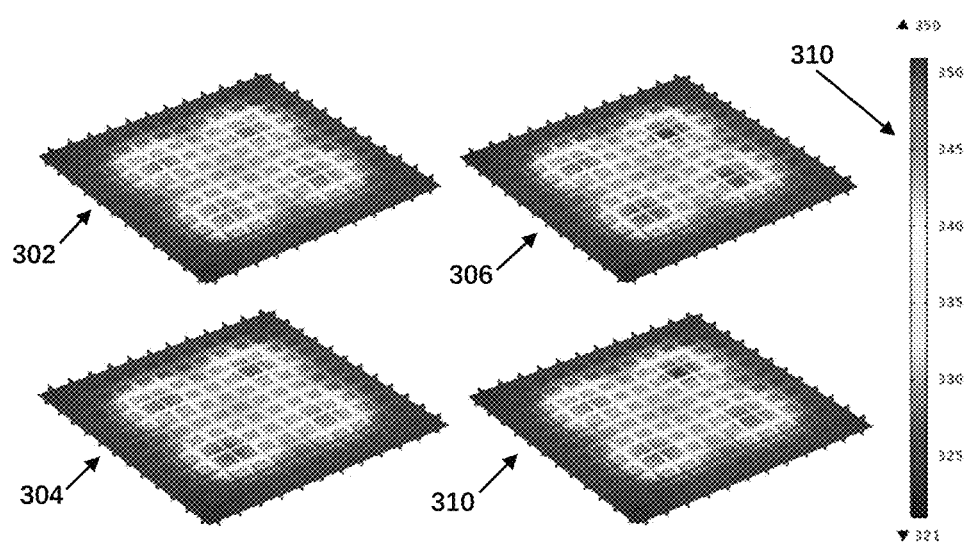
FIG. 14A and FIG. 14B illustrate a comparison of prediction results of random TSV distribution of 3D chips based on machine learning algorithms.

As shown in FIG. 14A, in the isothermal simulation results of the 3D chip, the hotspot temperature of the chip is always concentrated on the 4 CPU cores placed on each layer. Since different TSV distributions will affect the heat transfer from each CPU to the other layers, the distribution of hotspot temperature is located differently for each case. The comparison of the prediction deviations of all the sample sets 302, 304, 306, and 308 are shown in FIG. 14A with respect to the example temperature gradient 310.

24 sample data sets were taken as the training sets and 4 sets of samples were taken as the test set to predict the hotspot temperature of the 3D chip. Using the machine learning model obtained with this parameter, the predicted result is shown in Table 5. It also can be seen that K-CV algorithm is more efficient in optimization compared to genetic algorithm.

TABLE 5

Prediction process parameters and corresponding errors of random TSV location distribution for 4-layer 3D chips

| Algorithm | Layer number | n (training samples number) | N (test samples number) | m (dimensions) | c (loss function) | g (gamma function) | MSE |
|---|---|---|---|---|---|---|---|
| K-CV | 4 | 24 | 4 | 25 | 1.4142 | 0.0625 | 0.009796 |
| GA | 4 | 24 | 4 | 25 | 3.8446 | 0.0319 | 0.010809 |

Figure 14B:
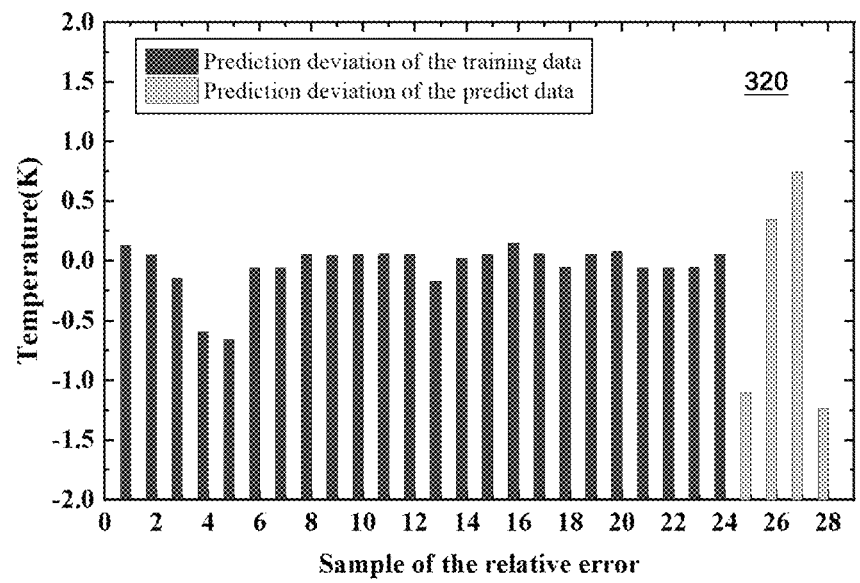

FIG. 14A and FIG. 14B illustrate a comparison of prediction results of random TSV distribution of 3D chips based on machine learning algorithms. FIG. 14A illustrates a comparison of the temperature (K) distribution of the 3D chip for the prediction set. FIG. 14B illustrates a graph 320 of the prediction deviation of 3D chip hotspot temperature for all training sets versus prediction sets.

From the hotspot temperature prediction for the case of random TSV, the case of the random CPU core locations and the case of random power allocation, it can be seen that within a certain allowable error range, algorithm for K-CV combined with SVR can satisfy the accuracy of the hotspot temperature prediction of the 3D chip in the case of parameter changes for the above three cases of 3D chip thermal analysis model.

To verify the accuracy of the random power allocation prediction set, the SVR regression model extends the prediction set of random power allocation to 30 W, 60 W and 90 W cases. Samples with different total power are used as the training set or test set, and two samples are verified at once (sample 1-sample 12). As shown in Table 6, Sample 1-sample 4 corresponds to the case of chip power of 30 W, sample 5-sample 8 corresponds to the case of chip power of 60 W, and sample 9-sample 12 corresponds to the case of chip power of 90 W. The training set model still uses the SVR regression model used in Section 5.2 to verify the accuracy of this model in predicting the random power assignment to 3D chip in the presence of power variations. The difference from the prediction in section 5.2 lies in the use of training and testing sets with different powers, for example, 28 training samples belonging to 30 W power samples and 2 testing samples belonging to 60 W power samples, while, the sample in section 5.2 corresponds to a chip power of 90 W.

Figure 15:
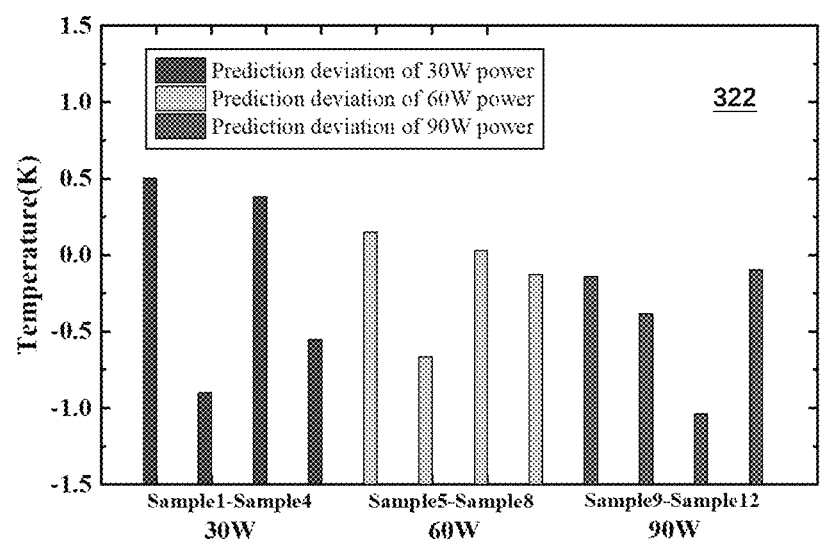
FIG. 15 illustrates a graph depicting prediction deviation data, in accordance with an embodiment.

The MAE, MSE metrics listed in Table 6 indicate that the prediction error is controlled within a reasonable range, indicating that the predicted value is very close to the sample value and the prediction model fits the sample model very well. The maximum prediction deviation of the three random power allocation prediction sets shown in FIG. 15 is controlled within 0.5K.

TABLE 6

Comparison of the effect of prediction accuracy corresponding to cases with different random power assignments

|  | MAE | MSE | $R^2$ |
| --- | --- | --- | --- |
| Sample1- Sample2 | 0.40085 | 0.394004 | 100% |
| Sample3- Sample4 | 0.4675 | 0.133583 | 100% |
| Sample5- Sample6 | 0.4094 | 0.0311787 | 100% |
| Sample7- Sample8 | 0.078 | 0.0311787 | 100% |
| Sample9- Sample10 | 0.26125 | 0.0506171 | 100% |
| Sample11- Sample12 | 0.46715 | 0.0740161 | 100% |

Figure 16:
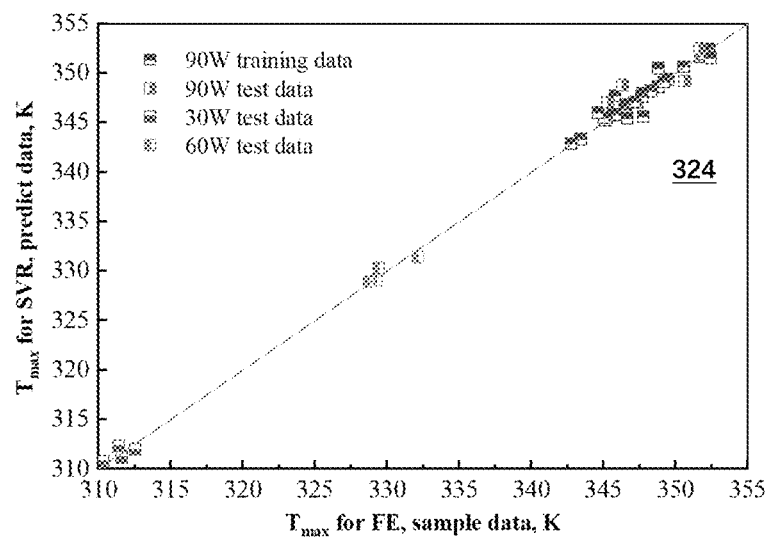
FIG. 16 illustrates a graph of a parity plot for machine learning based SVR using a sample data of random power allocation, in accordance with an embodiment.

FIG. 15 illustrates a graph 322 depicting prediction deviation data, in accordance with an embodiment. The graph 322 shown in FIG. 15 indicates prediction deviation to different samples under the random power allocation prediction algorithm FIG. 16 illustrates a graph 324 of a parity plot for machine learning based SVR using the sample data of random power allocation of 90 W predicts the test data of random power allocation of 30 W, 60 W and 90 W, in accordance with an embodiment. The graph 324 shown in FIG. 16 shows the comparison of hotspot temperature prediction values between the trained machine learning model and the finite element simulation model under the three-power allocation case. The R values for all three cases are very close to 1. Therefore, the data shown in graph 324 in FIG. 16 confirms that the SVR regression algorithm proposed in this work is in good agreement with the finite element simulation in the case of random power allocation.

To verify the accuracy of the random core location prediction set, the SVR regression model extends the case of prediction set to random CPU core location assignment for 8-layer 3D chips. In table 7, sample 13-sample 18 corresponds to this case. The MAE, MSE metrics listed in Table 7 indicate that the prediction error is controlled within a reasonable range. The square correlation coefficient ($R^2$) is also very close to 1, indicating that the same type of data set will get the desired prediction results using this regression model.

Figure 17:
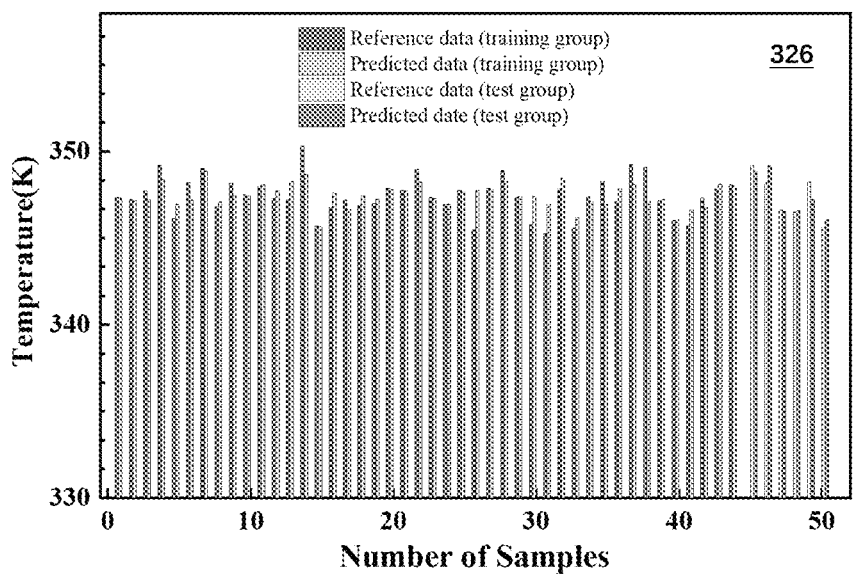
FIG. 17 illustrates a graph depicting a comparison of hotspot temperature prediction for the training and prediction sets corresponding to the machine learning algorithm for random CPU locations for an 8-layer chip, in accordance with an embodiment.

FIG. 17 shows a graph 326 of the comparison of the predicted values of hotspot temperature for all training and prediction sets for a complete 8-layer 3D chip with random CPU core location distribution. As can be seen in graph 326 of FIG. 17, the regression model can achieve more satisfactory prediction results. Although some of the extreme cases of the data in the training set resulted in partial deviations, such as the CPU core location near the edge of the package, the predicted data from the ML model maintained a good match with the simulated data, and FIG. 18 further confirms the effectiveness of the method.

TABLE 7

Comparison of the effect of prediction accuracy corresponding to cases with different random CPU location assignments

|  | MAE | MSE | $R^2$ |
| --- | --- | --- | --- |
| Sample13- Sample14 | 0.63905 | 0.554057 | 100% |
| Sample15- Sample16 | 0.077 | 0.356168 | 100% |
| Sample17- Sample18 | 0.6287 | 0.186983 | 100% |

The graph 326 of FIG. 17 is a comparison of hotspot temperature prediction for the training and prediction sets corresponding to the machine learning algorithm for random CPU locations for an 8-layer chip.

Figure 18:
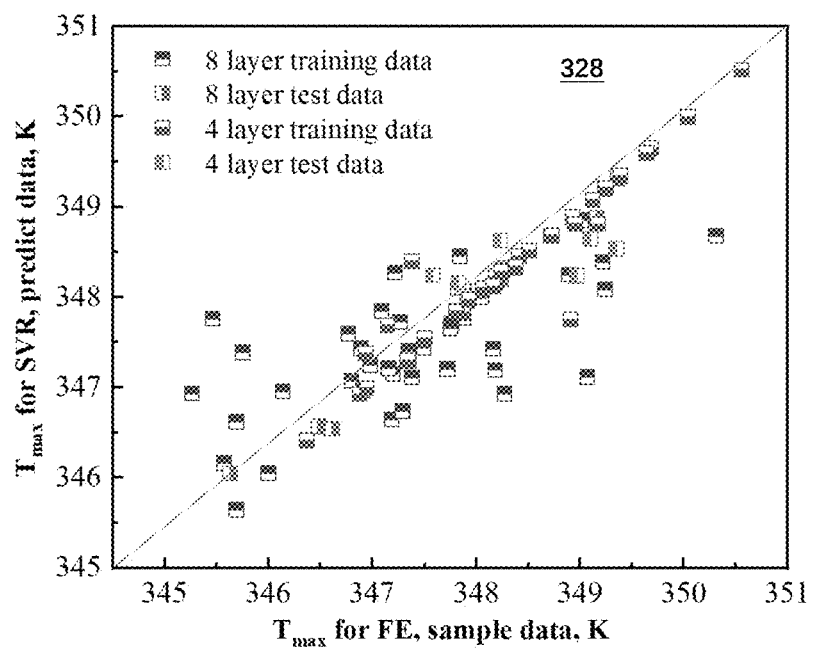
FIG. 18 illustrates a graph of a parity plot for machine learning based SVR with prediction of test dataset using training dataset model with 4-layer chip, 8-layer chip, in accordance with an embodiment.

FIG. 18 illustrates a graph of a parity plot for machine learning based SVR with prediction of test dataset using training dataset model with 4-layer chip, 8-layer chip.

Figure 19A:
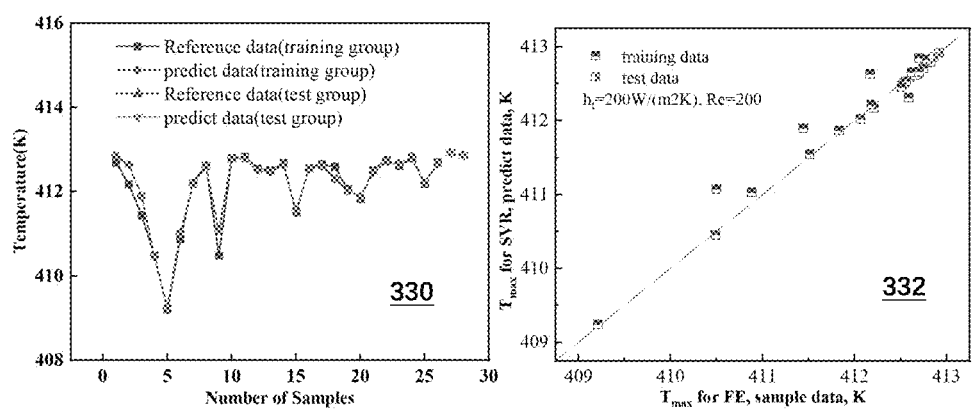
FIG. 19A, FIG. 19B, FIG. 19C and FIG. 19D illustrate graphs depicting a comparison of the hotspot temperatures corresponding to the training and prediction sets of the machine learning-based random TSV location assignment algorithm for different convective heat transfer coefficients and cooling fluid flow rates, in accordance with an embodiment.
Figure 19B:
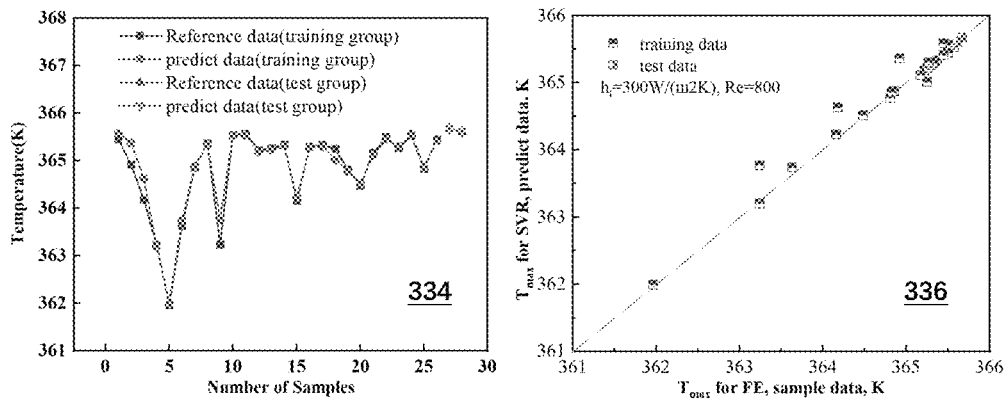
Figure 19C:
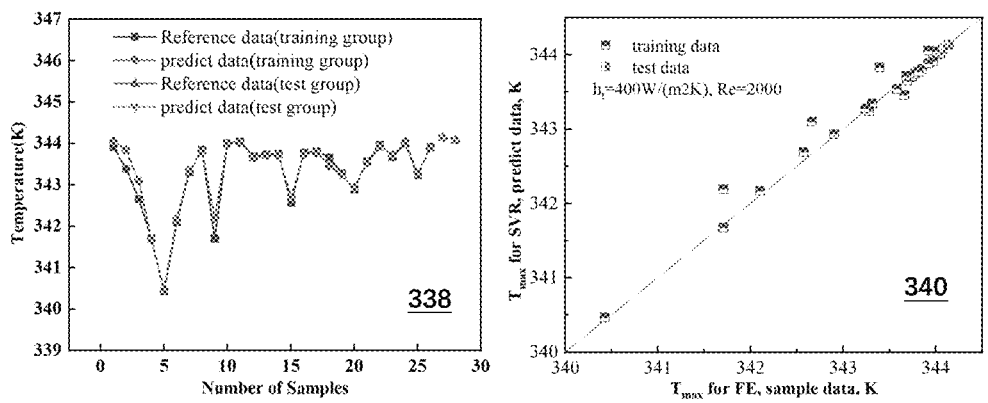
Figure 19D:
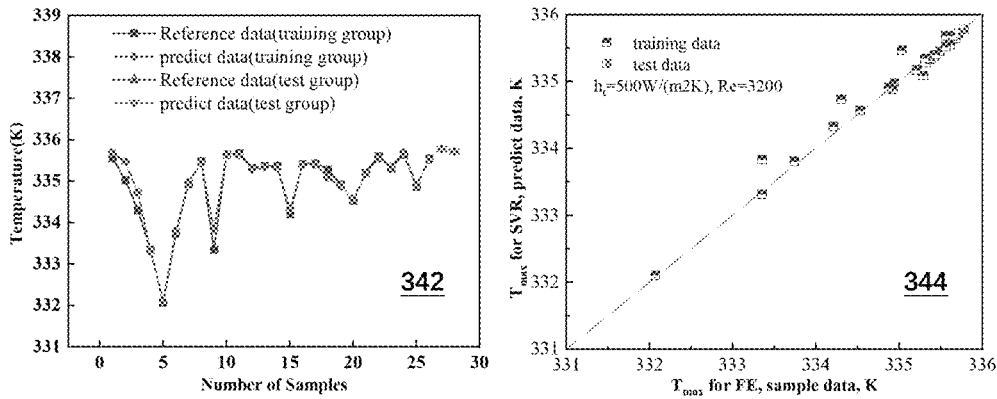

FIG. 19A and FIG. 19B illustrate graphs depicting a comparison of the hotspot temperatures corresponding to the training and prediction sets of the machine learning-based random TSV location assignment algorithm for different convective heat transfer coefficients and cooling fluid flow rates. Graphs 330 and 332 of FIG. 19A indicate that the cooling environment is Convection coefficient of the top surface of the chip $h_t=200$, the Reynolds number Re=200. Graphs 334 and 336 of FIG. 19B indicate that the cooling environment is Convection coefficient of the top surface of the chip $h_t=300$, the Reynolds number Re=800. Graphs 338 and 340 of FIG. 19C indicate that the cooling environment is Convection coefficient of the top surface of the chip $h_t=400$, the Reynolds number Re=2000. Graphs 342 and 344 of FIG. 19D indicate that the cooling environment is Convection coefficient of the top surface of the chip $h_t=500$, the Reynolds number Re=3200.

To verify the accuracy of the random TSV location prediction set, the SVR regression model extends the case of prediction set to random TSV location assignment for 3D chips. In FIG. 19A and FIG. 19B, the prediction model was used to verify the hotspot temperature values of the 3D chip corresponding to different TSV distributions (30 sets of sample data) under varying cooling conditions. The four different groups of cooling environments are corresponding to the top side of the chip with a convective cooling coefficient varying from 200-500 and the side of the chip with a Reynolds number of the cooling fluid from 200-3200.

As can be seen the 4-parity plot from FIG. 19A and FIG. 19B, the effect of the change in external cooling strategy on the hotspot temperature of the chip is basically linear, and the trend of the line graph of the hotspot temperature change corresponding to the four sets of comparisons. In contrast, the variation of the hotspot temperature corresponding to the random TSV distribution is nonlinear, or random. Therefore, the algorithm can be applied to hotspot temperature prediction for any change in external cooling conditions.

Figure 20:
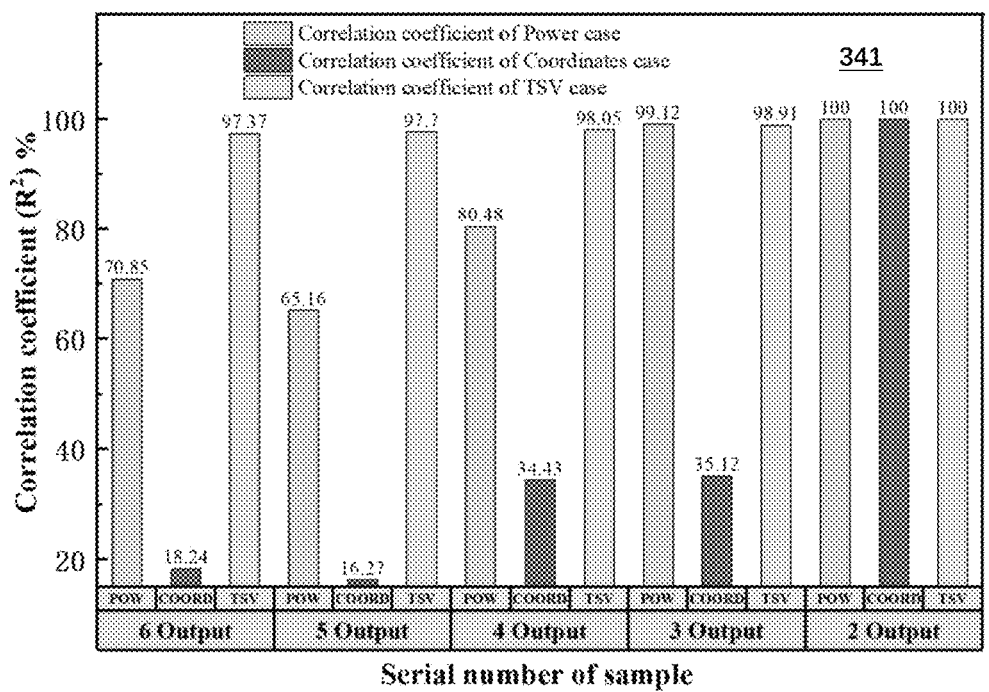
FIG. 20 illustrates a graph depicting data indicative of correlation coefficients for the power case, the coordinate case and the TSV case, in accordance with an embodiment.

FIG. 20 illustrates a graph 341 depicting data indicative of correlation coefficients for the power case, the coordinate case and the TSV case, in accordance with an embodiment. The graph 321 shown in FIG. 20 illustrates a comparison of squared correlation coefficients corresponding to three groups (random power allocation, random CPU location allocation, and random TSV distribution) of multi-input and multi-output SVR regression algorithms.

TABLE 8

Comparison of the correlation coefficients of three sets of multiple-input multiple-output SVR regression prediction algorithms corresponding to different numbers of outputs

|  |  | 6 output | 5 output | 4 output | 3 output | 2 output |
|---|---|---|---|---|---|---|
| Power Case(sample size is 30) | Correlation coefficient $(R^2)$% | 70.85 | 65.16 | 80.48 | 99.12 | 100 |
|  | Prediction bias(K) | 0.0542 | 0.0650 | 0.0570 | 0.0460 | 0.093 |
| Coordinates case(sample size is 50) | Correlation coefficient $(R^2)$% | 18.24 | 16.27 | 34.43 | 35.12 | 100 |
|  | Prediction bias(K) | 0.1631 | 0.1130 | 0.2577 | 0.1462 | 0.403 |
| TSV case(sample size is 30) | Correlation coefficient $(R^2)$% | 97.37 | 97.70 | 98.05 | 98.91 | 100 |
|  | Prediction bias(K) | 0.0214 | 0.0103 | 0.0108 | 0.0064 | 0.0002 |

The machine learning models corresponding to the above algorithms are all SVR algorithm model using samples with multiple feature components. That is, the attribute matrix of training set is multidimensional. In the case of random power allocation, the input is the value of the power distribution for each layer. In the case of random power allocation and random CPU core allocation, the input is the coordinate position of each core. In the case of random TSV distribution, the input is the number of TSVs distributed in each segmented small plane of the die layer. The outputs corresponding to each of the three models are multiple hotspot temperature values corresponding to their respective samples.

Figure 21:
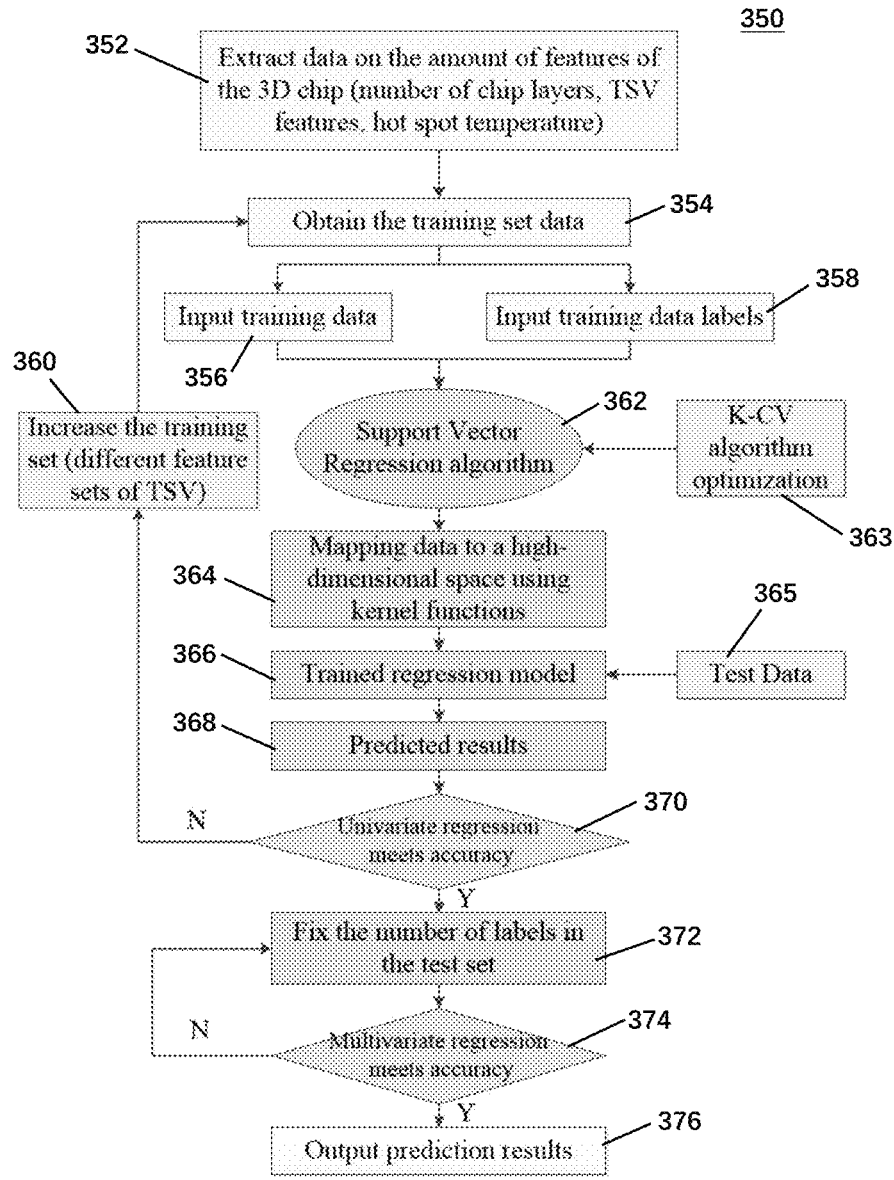
FIG. 21 illustrates operational steps of a workflow of a ML-based algorithm/method for predicting hotspot temperature of 3D chips with different uniform TSV distributions, in accordance with an embodiment.

As can been seen from graph 341 of FIG. 20, in the case of random power allocation, the model with 2-3 output predictions at a time is closer to the sample model. In the case of random CPU core allocation, the model with only 2output predictions can accurately predict the sample model. More than 2 outputs with small correlation coefficient values indicate a large gap between the prediction set and the actual sample model. In the case of random TSV distribution, the output values of 2-6 hotspot temperatures predicted at a time all accurately reflect the sample model Similarly, Table 8 verifies the expected accuracy of this SVR algorithm based on chip hotspot temperature prediction with output values under small sample (30-50 sample data) conditions. The prediction deviations of the prediction sets corresponding to all the test samples used were below 0.4K FIG. 21 illustrates operational steps of a workflow of a ML-based algorithm or method 350 for predicting hotspot temperature of 3D chips with different uniform TSV distributions. As shown at block 352, a step or operation can be implemented to extract data on the number of features of the 3D chip (e.g., number of layers, TSV features, hot spot temperature, etc.). Next, as depicted at block 354, a step or operation can be implemented to obtain the training set data. Then, as shown at block 356, a step or operation can be implemented to input training data. As indicated at block 358, a step or operation can be implemented to input training data labels. Then, as shown at block 362, a support vector regression algorithm can be implemented with respect to K-CV algorithm optimization, as shown at block 363.

Next, as shown at block 364, a step or operation can be implemented to map data to a high-dimensional space using kernel functions. Then, as shown at block 366, a trained regression model can be implemented with respect to test data as shown at block 365. Thereafter, as shown at block 368, predicted results can be obtained or generated. Then, as indicated at decision block 370, a test can be performed to determine if univariate regression meets accuracy. If not, then the operation shown at block 360 can be implemented involving increasing the training set (different feature sets of TSV), followed by the implementation of the step or operation shown at block 354, and so on. If not, then the step or operation shown at block 372 can be implemented involving fixing the number of labels in the test set.

Then, as shown at decision block 374, a step or operation can be implemented to test if multivariate regression meets accuracy. If not, then the operation shown at block 372 can be repeated. If so, then output prediction results ca be generated or obtained, as shown at block 376.

The entire prediction flow of 3D chip hotspot temperature with random TSV distribution is shown in the method 350 of FIG. 21. Temperature prediction based on this model with other parameter adjustments also applies to this process. Only the number of samples and the validation set needs to be adjusted to ensure that the squared correlation coefficient $R^2$ between the validation set and the original data is as close to 1 as possible to make the prediction error as small as possible.

Prediction of hotspot temperature of SVR based 3D chip with variable parameters and variable number of layers. One of the difficulties of 3D chip thermal management is that with the increasing number of chip layers, the internal structure of the chip becomes extremely complex, and the number of internal gate circuits and components will increase exponentially, which poses a great obstacle to modeling and analysis, and its computational volume and modeling difficulty will not be manageable.

The previous section has verified that the SVR-based machine learning algorithm can accurately predict the change in hotspot temperature of the chip under changes in parameters such as power, CPU core location, and TSV distribution density. In what follows, it will be verified whether this algorithm can predict the hotspot temperature of a 3D chip with increasing number of layers and changing graphics parameters based on a certain amount of training sample data.

Changing the area of the core processor in the 3D chip, the total power of the chip, the thickness of the heat sink and the distribution of TSV will greatly affect the heat dissipation of the chip. As shown in Table 9, four combinations of sample data sets for the 3D chip structure with variable parameters under the above parameter change conditions are listed.

For example, considering the sample data sets of Case A and Case B with layers 4-28 are known, and the sample data of Case C is expected to be predicted, then 2 sets of sample data of Case C are also needed as training data to ensure the training model is more accurate. Therefore, the data sets of Case A, Case B and Case C (layer 4, layer 5 data) are used as the training set and the hotspot temperature data for layers 6-28 of Case C are used as the test set. The corresponding regression model training results and prediction results are presented in FIG. 22A. Similarly, the data sets of Case A, Case D and Case B (layer 4, layer 5 data) can be used as the training set and the hotspot temperature data for layers 6-28 of Case can be is used as the test set. The corresponding regression model training results and prediction results are presented in FIG. 22B FIG. 23A and FIG. 23B illustrate graphs 376 and 378 showing the comparison of the parity plot of the two sets of predicted data. From the graph and data comparison, it can be seen that the deviation between the predicted and actual values of both groups of cases is less than 0.2%. Both sets of data comparison plots show that the predicted data agree well with the actual simulated temperature values.

TABLE 9

Comparison of sample sets of 3D chips with changing parameters

| | Chip Area | Total Power | Heat Sink Thickness | TSV |
|---|---|---|---|---|
| Case A | 20 × 20 mm$^2$ | 90 W | 4 mm | No TSV |
| Case B | 10 × 10 mm$^2$ | 60 W | 6 mm | Uniform TSV |
| Case C | 30 × 30 mm$^2$ | 30 W | 2 mm | No TSV |
| Case D | 15 × 15 mm$^2$ | 80 W | 1 mm | Uniform TSV |

Figure 22A:
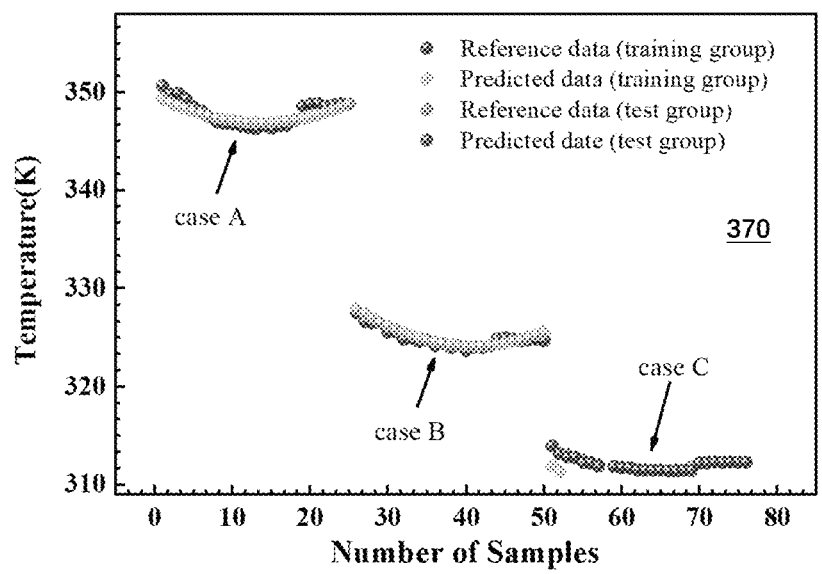
FIG. 22A and FIG. 22B illustrate graphs depicting a comparison of prediction results of 28-layer 3D chips based on machine learning algorithm SVR, in accordance with an embodiment.
Figure 22B:
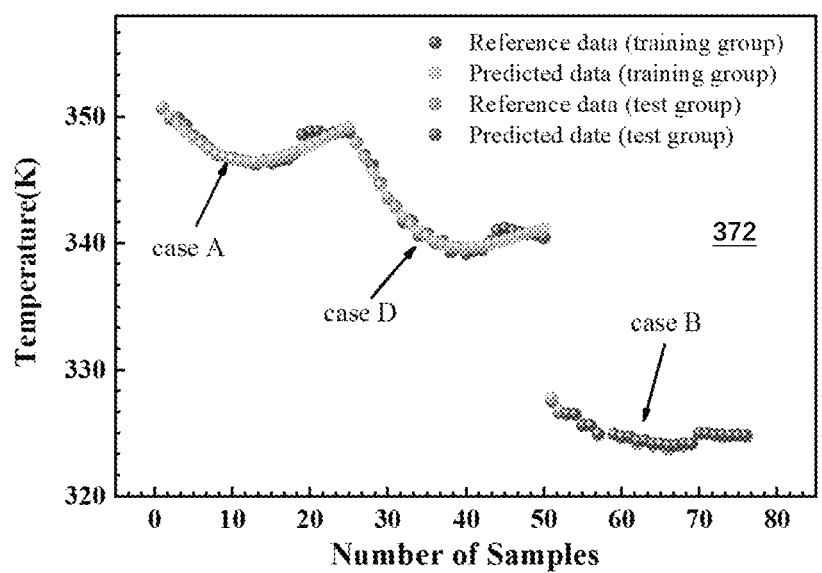
Figure 23A:
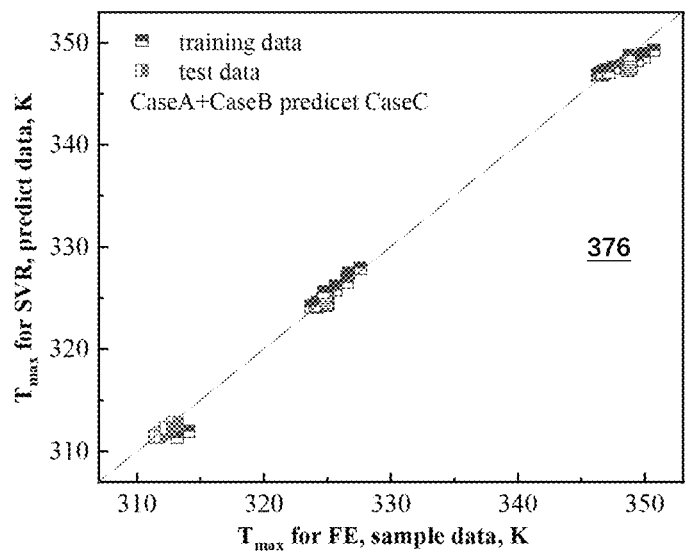
FIG. 23A and FIG. 23B illustrate graphs showing parity plots for machine learning based SVR with prediction of training dataset and test dataset, in accordance with an embodiment.
Figure 23B:
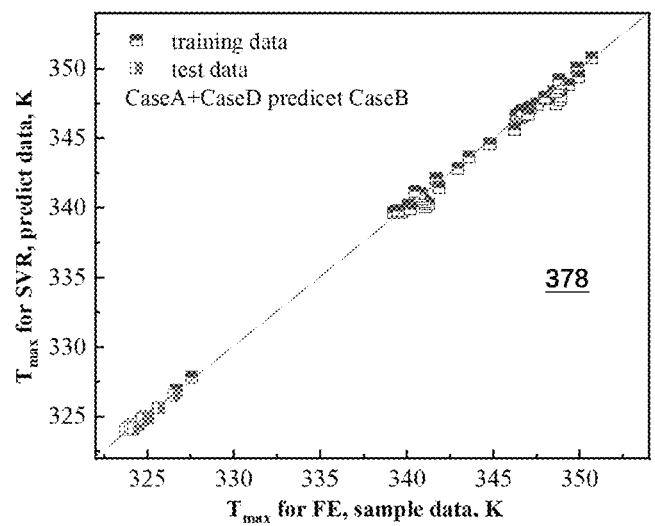

FIG. 22A and FIG. 22B illustrate graphs 370 and 372 depicting a comparison of prediction results of 28-layer 3D chips based on machine learning algorithm SVR. Graph 370 of FIG. 22A illustrates Prediction results of the training dataset consisting of Case A, Case B and Case C (layer 4, layer 5 data) and the test dataset (hotspot temperature data for layers 6-28 of Case C). Graph 372 of FIG. 22B illustrates prediction results of the training dataset consisting of Case A, Case D and Case B (layer 4, layer 5 data) and the test dataset (hotspot temperature data for layers 6-28 of Case B).

FIG. 23A and FIG. 23B illustrate graphs 376 and 378 showing parity plots for machine learning based SVR with prediction of training dataset and test dataset, in accordance with an embodiment. Graph 376 of FIG. 23A shows the use of the training set Case A+Case B+Case C (layer 4, layer 5 data) to predict hotspot temperature data for layers 6-28 of Case C. Graph 378 of FIG. 23B shows the use of the training set CaseA+CaseD+CaseB (Layer 4, Layer 5 data) to predict hotspot temperature data for layers 6-28 of Case B.

Although heterogeneous packaging represented by 3D ICs has become a key factor for future developments, implementing new technologies will face many challenging issues. Compared to traditional packaging technologies, 3D IC heterogeneous packaging is not only an innovation in packaging factory technology, but also brings challenges to existing design processes and design tools.

Due to the significant improvement in integration, the heat generation of 3D stacked chips has become more concentrated, with heat dissipation being the primary issue; secondly, during the bonding process of chips, it is necessary to ensure the reliability of mechanical stress between the chip, intermediate layer, and expanded or shrunk substrate. Furthermore, the high-frequency signals between chips need to meet the requirements of timing and signal integrity. Finally, after the chip stacking is completed, it is necessary to check the wiring to ensure that each layer of chips is not damaged. These are all challenges that need to be faced in the design and packaging of 3D chips.

The high temperature caused by local heat flux poses a threat to the functional lifespan of 3D chips. In order to prevent local thermal failure of stacked chips, more advanced packaging technology and chip level cooling methods are needed to dissipate a large non-uniform heat flux.

Microfluid cooling technology has long been proven to be an effective method for cooling integrated circuits. Embedding microfluidic structures into the chip for cooling can allow heat to conduct vertically, reduce temperature gradients, and effectively suppress the horizontal diffusion of local hotspots in the chip. By enhancing the density of the microfluidic structure, optimizing the shape of the microfluidic structure, or adjusting the flow mode of the coolant, the impact of large heat flux inside the chip can be effectively reduced.

However, 3D stacked chips not only increase the number of hotspots per unit area, but also expand the complexity of the spatial structure. The main reason for this is that as the miniaturization of chips becomes increasingly difficult, and the market's pursuit of high-performance chips continues, the industry has begun to explore breakthroughs in the packaging field. More and more components are being added to advanced packaging to process, move, and store more data, although traditional solder balls and/or copper micro bumps will still be used in the foreseeable future. New technologies that enhance or replace traditional interconnect technologies and provide more miniaturization space are being developed. Size and cost remain decisive factors in the development of 3D chip technology. Copper micro bumps are smaller than solder balls/bumps and can achieve more I/O in packaging. Therefore, it has become a new technology that replaces traditional interconnect technologies, increases the number of I/Os, and provides more miniaturized space.

Figure 24:
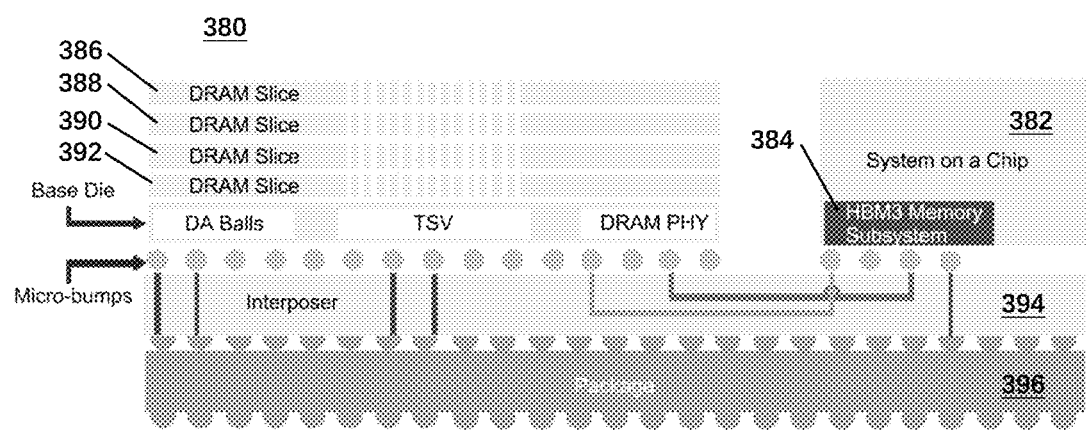
FIG. 24 illustrates a 2.5D/3D system with HBM (High Bandwidth Memory), which may be implemented in accordance with an embodiment.

FIG. 24 illustrates a 2.5D/3D system 380 with HBM (High Bandwidth Memory), which may be implemented in accordance with an embodiment. The 2.5D/3D system 380 shown in FIG. 24 can include a plurality of DRAM slices 386, 388, 390, 392 with respect to a base die and micro bumps. The package layer 396 is located below an interposer 394. System on a Chip 382 is also shown in FIG. 24 including an HBM3 memory subsystem 384. Other features include DA balls, TSV, and DRAM PHY.

As shown in FIG. 24, the copper micro bumps can connect the intermediate layer and the substrate. Micro bumps can also be used for chip to chip connections. Currently, the minimum distance between micro bumps in advanced packaging technology is 40 µm. For pitches of less than 40 µm micro-bumps, the industry is investigating a new technique called copper hybrid bonding. In hybrid bonding technology, the connection of bare crystals is not through bumps in the packaging. On the contrary, this technology utilizes tiny copper to copper interconnections to achieve narrower pitch packaging with more I/O than traditional packaging. For packaging technology, the distance between hybrid bonding should be at least 10 μm and below. But this technology is too expensive and requires expensive semiconductor wafer factories to implement these processes.

The huge challenges faced by hybrid bonding are wafer surface cleanliness, wafer warping, and the gradient between copper and dielectric materials in chips. Due to cost considerations, future packaging will shift towards smaller copper protrusions with narrower spacing, namely protrusion micro reduction and protrusion bonding processes. This technology will also bring some challenges. With an increase in the number of bumps and a reduction in bump spacing, chip level bump coplanarity, bump surface roughness and bump hardness becomes more and more important. The entire manufacturing process is also full of challenges.

Nevertheless, next-generation bump technology and hybrid bonding will both play an important role in the industry, driving the development of technology towards more advanced packaging and chiplet models. Complex architecture and process improvements or technological innovations compared to 3D vertically stacked chips, chiplet is expected to become the next generation chip design trend. Blending or scaling bumps is a key part of the chiplet puzzle.

Chiplet technology refers to known good die (KGD) or IP blocks with special purposes or single functions; Then, when developing high-performance systems, the required system performance can be achieved by selecting appropriate stacked chiplets. The current packaging technology is developing towards 2.5D technology in a side-by-side manner, integrating through the design of interposers and redistribution layers (RDL). 3D packaging, on the other hand, involves stacking multiple chips upwards, and all chips, except for the underlying ones, need to transmit signals through TSV (silicon perforation). There are currently two main types of mainstream architectures proposed. Based on functional division into multiple chiplets, one is that a single chiplet does not contain a complete set of functions. Different types of products are packaged through different chiplet combinations, typically represented by the AMD Zen2/3 series products. The second type is a single chiplet containing a relatively independent and complete set of functions, which achieves linear performance growth through cascading multiple chiplets. Typical representatives are the Apple M1 Ultra and Intel Sapphire rapids series.

In summary, whether it is narrow pitch packaging or wide pitch packaging, bump packaging technology will continue to develop in the future. Both advanced bump and hybrid bonding will provide narrow spacing interconnections for new advanced packaging technologies. These new technologies will also greatly increase the complexity of chip structure and process design. The bump miniaturization technology used in the hybrid bonding process requires higher temperatures and greater pressure, increasing costs and the risk of chip damage. Manufacturing small bumps is extremely challenging. During the manufacturing process, the overall coefficient of thermal expansion mismatch between the substrate and the chip may occur, resulting in higher warpage and chip displacement. Therefore, there is an urgent need for more effective methods to monitor, manage and optimize the temperature of 3D chip design and manufacturing processes.

To solve the technical bottleneck of thermal management during the development of 3D chip technology, one of the effective solutions is to predict the location or thermal characteristics of 3D chip hotspots so that the hotspot interactions can be suppressed by means of thermal management. For example, the local microfluidic structure is modified to enhance the cooling effect based on the predicted hotspot interactions. In the prediction process, previous studies have mainly used numerical simulations and theoretical derivations. Numerical simulations typically use the finite element method (FEM) to discretize the mathematical models, and with an increase in the 3D chip structures as well as package complexity, the simulation capability and the available computational time it is difficult to meet the computational requirements of ultra-large scale integrated circuits in stacked spaces. Theoretical derivations allow analysis of heat transfer processes in microfluidic structures, but existing single models must be continuously modified based on experimental or process parameter adjustments.

At present, the development of artificial intelligence technology has brought new computing models for chip development, and machine learning has brought unique market demands and unlimited opportunities. Machine learning is a powerful tool, as long as sufficient data is provided, computers can predict extremely complex situations. This is particularly useful for complex issues related to thermal management of 3D chips and materials science. For example, the feasibility of Cu—Cu bonding in fine pitch applications requires a lot of human time to sift through the data to find potential applicable conditions, while the internal thermal analysis and prediction of 3D chips using machine learning for novel thermal interface materials and novel structures can provide tremendous support for achieving 3D integration with ultra-high-density interconnects.

TABLE 10

Summary of applications of Artificial Intelligence in Semiconductor Device Thermal Management and Chip Design

| Categories | Application | AI algorithm | Methods |
| --- | --- | --- | --- |
| Active cooling | Frequency-scaled thermal-aware test/task scheduling | regression-based learning | The test scheduling algorithm uses the test clock frequency as an important parameter and scales the frequency to estimate the temperature of the 3D IC with high accuracy |
| | | Convolutional neural network (CNN) | A machine learning bootstrapping mechanism is proposed to predict the optimal operating frequency of CPU cores during the execution of OpenCL graphics processing unit (GPU) cores in order to reduce the operating temperature of the chip |
| | Optimized design of packaging | Radial Basis Neural Network (RBNN), Genetic Algorithm (GA) | A hybrid approach using Taguchi's experimental design, RBNN and GA was used. The heat transfer model of Fan-out (FO) package was developed to obtain the optimal design of the chip package. |

TABLE 10-continued

Summary of applications of Artificial Intelligence in
Semiconductor Device Thermal Management and Chip Design

| Categories | Application | AI algorithm | Methods |
|---|---|---|---|
| | TSV layer assignment optimization | effective linear regression | By tracking the gradient cost function to predict the error of the linear regression model, the proposed TSV assignment scheme achieves better lead length and improves the chip temperature |
| | Fast transient thermal analysis of 2.5D/3D chips | DeepOnet | Generate valid transient response curves using a machine learning attenuated surface predictor that computationally generates a curve for each power value in a linear superposition-based transient power distribution. Parallel computation of transient thermal inference models is implemented. |
| | Thermal-aware core hotspot alignment | Artificial Neural Network (ANN), GA | A genetic algorithm is combined with a supervised machine learning based artificial neural network to optimize the hot spot region in a three-layer 3D integrated circuit. The aim is to minimize the maximum temperature of the core. |
| | Prediction of chip hotspot temperature, thermal simulation | Deep Nueral Network (DNN) | Predict possible hot spot temperature locations on the chip using a data-driven DNN-based thermal solver |
| | | ANN, POD-RBF | Combining two machine learning methods, Proper Orthogonal Decomposition (POD)-RBF and ANN, to achieve high accuracy prediction of chip temperature |
| | | XGBoost | Compare regression models with XGBoost machine learning models to predict CPU temperature. Investigate the impact of activities under CPU-intensive workloads on temperature and energy consumption. |
| | | Linear regression | Combines linear regression to predict the full chip temperature based on current chip operating power consumption, core utilization, and measured sensor temperature |
| | | DNN, CNN | Using combinable autoencoder machine learning simulator (CoAEMLSim), the chip temperature distribution corresponding to constant and distributed HTCs (Heat Transfer Coefficients) is predicted. |
| | | Long Short Term Memory (LSTM)-based DNN | System-level features such as chip frequency, instruction count and other high-level performance metrics are used as inputs to train LSTM networks for microprocessor full-chip heat map prediction. |
| | Diagnose the health status of the chip | DNN | Based on heat flux health monitoring, externally measured temperature information and neural networks (NN) are used to diagnose package degradation of individual chips. |
| | Active cooling of chips based on thermal awareness | Recurrent Neural Network (RNN) | Based on hot-spot aware Thermoelectric Cooler (TEC) arrays and machine learning algorithms for targeted cooling of spatially and temporally varying on-chip hotspots of multi-core processors. |
| | Optimized architecture for high thermal efficiency of the chip | CNN | CNN-based joint thermal performance optimization method to achieve significant reduction in core temperature of 3D NoC (on-chip) with heterogeneous performance without significant performance loss |
| | Optimal design of 3D chip manufacturing process | CNN | Highly accurate and efficient prediction of effective thermal conductivity(ETC) of nano-silver bonding layer of chips based on CNN |
| Passive cooling | Optimized flow distribution of micro-channels/ Heat Sinks | BP Neural Network | A BP neural network is used to predict the "condition-flow distribution-temperature" mapping relationship. The optimal flow distribution strategy is achieved by combining genetic algorithm. |
| | | Linear regression | Flow rate optimization based on single-phase immersion cooling process to reduce the junction temperature of the chip. |

Table 10 shows the summary of applications of Artificial Intelligence in Semiconductor Device Thermal Management and Chip Design, a review of relevant studies in this area over the past two years reveals that to overcome some of the key challenges in 3D IC technology, artificial intelligence technologies are beginning to play an important role in thermal management, chip architecture optimization, manufacturing process optimization and passive cooling system design. Based on the urgent need to improve chip thermal management, thermal simulation of chips and prediction of hotspot temperatures have become a hot research area for introducing artificial intelligence techniques. The application of AI technology in chip architecture optimization, thermal-aware task scheduling and optimized design of heat sink is also gradually increasing. It is worth mentioning that AI technology is starting to make breakthroughs in chip bonding layer, chip packaging technology.

It is evident that AI technology will change the research paradigm of the chip industry. The traditional research solution is modeling+testing, while the AI research solution is a large amount of training data+machine learning. The acquisition of training data becomes the key, and the current main way of acquiring data relies on experimental research, image recognition technology and finite element technology. The research is a multidisciplinary cross-fertilization of mechanics, materials and electronics. In addition, the laws obtained from AI can also be used to study complex processes to reveal mechanisms. In the future, AI technology is bound to make progress in related key technology nodes in areas such as 3D chip bonding, ultra-small pitch chiplet packaging, and heat dissipation of chips with ultra-high heat flow density.

A prediction algorithm for hotspot temperature of 3D stacked chips using cross-validation optimization method with SVR regression algorithm is investigated. The thermal analysis model of 2-28-layer 3D chip is established using COMSOL, and the effective thermal conductivity of each component of the complex stacked structure of 3D chip is obtained according to thermal resistance series-parallel network and integral averaging method. The variation of the hotspot temperature inside the 3D chip under fluid cooling conditions was investigated by varying the pertinent parameters. These changes include the power allocation of each layer of the 3D chip, the location of CPU core coordinates in each layer of the 3D chip, and the location and density of TSV distribution.

A machine learning method (SVR regression prediction model with optimized parameters based on K-CV algorithm) is established to predict and evaluate the hotspot temperature values and trends of the 3D chip under random power allocation, random CPU core coordinate locations, and random TSV distribution. The SVR model with n sample (n is the number of whole dataset) and m-dimensional attribute matrix (where m is the number of layers of the chip to which the sample data belongs) for the case of random power distribution can result in more accurate prediction results for predicting the hotspot temperature of the three 3D chips with variable parameters.

In the case of random CPU core location, an n sample and 4-dimensional attribute matrix for the case of random power distribution can produce more accurate prediction results for predicting the hotspot temperature of two 3D chips with variable parameters at a time. SVR model can be used to obtain more accurate prediction results after processing the coordinate data by dimensionality reduction. In the case of random TSV distribution, n sample and 25-dimensional attribute matrix for the case of random power distribution can produce more accurate prediction results for predicting the hotspot temperature of six 3D chips with variable parameters at a time after processing with the effective thermal conductivity plane segmentation method.

The prediction deviations of the above three prediction sets are close to 0.6 K, and the correlation coefficient $R^2$ is very close to 1. Also, a method is proposed for predicting the effect of variations in graphics parameters and chip layers on the internal heat conduction of multilayer 3D stacked chips. The prediction deviation for this case is less than 0.2%, therefore, using knowledge of hotspot temperature data for 3D chips with fewer layers, it is possible to more accurately predict hotspot temperature values for 3D chips with similar structures with more layers (up to 28 or more).

The validation results show that this algorithm/method is suitable for predicting the values and trends of hotspot temperature under most cases when changing 3D chip-related graphical parameters and cooling parameters, and only a small sample of data is needed for training (e.g., no more than 50 sample data). This is a new and accurate machine learning algorithm that can adapt to the changing 3D chip stack structure. Especially for the next generation of advanced packaging processes, where bumps are becoming smaller in size and spacing and bonding technologies are evolving, previous work by our group has provided analytical derivations for deriving thermal analysis of two-phase or multi-phase composites acting as intermediate layers for 3D chips. This will be very useful for further application of machine learning algorithms to the thermal management of future advanced packaging technologies for 3D chips.

Based on the foregoing, it can be appreciated that parameter changes in the complex internal structure of multi-layer 3D stacked chips will greatly reduce the efficiency of modeling and thermal analysis. In this work, by combining thermal simulation analysis with machine learning algorithms, we can skillfully predict the hotspot temperature changes of 3D chips up to 28 layers while changing some key parameters of 3D chips with less computational effort. K-fold Cross Validation (K-CV) algorithm and support vector regression (SVR) algorithm were developed to predict the variations in hotspot temperature of the 3D chip while changing modeling and cooling parameters.

Based on the training matrix, the support vector regression (SVR) model can accurately predict the random power distribution case, the random processor core location distribution case, and the random Through Silicon Via (TSV) distribution case. The validation results show that the prediction accuracy deviation is close to 0.6K, and the correlation coefficient $R^2$ is close to 1. Meanwhile, the variable parameter and variable layer prediction method based on the aforementioned training model can more accurately predict the hotspot temperature of the 3D chips with higher layers (28 layers) from the modeling analysis data of 3D chips with lower layers (4-5 layers). Its prediction deviation is less than 0.2%. The predicted data match the simulated numerical data quite well, indicating that the predictive algorithm can accurately feed the sample data set.

Although the operations of the method(s) herein are shown and described in a particular order, the order of the operations may be altered so that certain operations may be performed in an inverse order or so that certain operations may be performed, at least in part, concurrently with other operations. In another embodiment, instructions or sub-operations of distinct operations may be implemented in an intermittent and/or alternating manner.

At least some of the operations for the method(s) described herein can be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), Flash memory, and so on.

Alternatively, embodiments of the invention may be implemented in hardware or in an implementation containing hardware and software elements. In embodiments that do utilize software, the software may include firmware, resident software, microcode, etc.

In some alternative implementations, the functions noted in the blocks may occur out of the order noted in the figures. For example, two blocks shown in succession may, in fact, be executed concurrently, or the blocks may sometimes be executed in the reverse order, depending upon the functionality involved. It will also be noted that the blocks of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "apparatus" or "system." Furthermore, aspects of the present disclosure may take the form of a computer program product embodied in one or more non-ephemeral computer readable media having computer readable and/or executable program code embodied thereon.

Although not required, the disclosed embodiments can be described in the general context of computer-executable instructions, such as program modules, being executed by a single computer. In most instances, a "module" (also referred to as an "engine") may constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can relate to a collection of routines and data structures that perform a particular task or implements a particular data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and ultimately in energy savings and efficiencies in a data-processing system such as, for example, a processor including multi-layer IC chips incorporating a processor or processors. A "module" can perform the various steps, operations or instructions of the methods discussed herein.

Although specific embodiments of the invention have been described and illustrated, the invention is not to be limited to the specific forms or arrangements of parts so described and illustrated. The scope of the invention is to be defined by the claims appended hereto and their equivalents.

Nomenclature x, y, z Cartesian coordinates
H height of 3D IC package [m]
h convective heat transfer coefficient [W(m$^2$·K)$^{-1}$]
T temperature [K]
k thermal conductivity [W(m·K)$^{-1}$]
$L_c$ characteristic length [m]
$n_v$ normal coordinate
$P_{Eh}$ Péclet Number
$R_{Eh}$ Reynolds number
u x-component of velocity [m s$^{-1}$]
V y-component of velocity [m s$^{-1}$]
W z-component of velocity [m s$^{-1}$]
q heat flux [W m$^{-2}$]
S area of solid surface [m$^2$]
$\dot{q}_g^*$ non-dimensional volumetric heat generation in the processor
$\Theta^*$ dimensionless temperature
ω coefficient of the support vector in the decision function
β constant term in the decision function
C penalty coefficient
ε tolerance deviation
$α_i$ Lagrange multipliers
φ(x) kernel function
σ width coefficient of the RBF kernel function
C parameter of Epsilon-SVR (loss function)
g Setting of gamma function in kernel function
v Number of n's in n-fold cross-validation
$K_n$ the nth layer of 3D chips
P Processor power [W]
n number of training samples
N number of test samples
m number of attributes (dimensions)
a The height of the TIM layer for 3D chips [m]
b Edge length of TIM layer for 3D chips [m]
A The width of the Die layer of a 3D chip [m]
B The length of the Die layer of a 3D chip [m]
y real value of dataset
ŷ predicted value of SVR

What is claimed is:

1. A method for fast prediction of hotspot temperatures in three-dimensional (3D) integrated circuit (IC) chips, comprising:
   inputting a dataset comprising thermal simulation data and associated parameters for 3D IC chips, wherein the dataset includes variables associated with power distribution, processor core location distribution, and Through Silicon Via (TSV) distribution;
   applying a K-fold Cross Validation (K-CV) algorithm to train a machine learning model using the inputted dataset, wherein the K-CV algorithm is employed to optimize the training process and prevent overfitting; and
   utilizing a Support Vector Regression (SVR) algorithm within the trained machine learning model to predict hotspot temperatures of the 3D IC chips; and
   adjusting a cooling strategy for cooling the 3D IC chips, in response to monitoring the hotspot temperatures via the trained machine learning model.

2. The method of claim 1 further comprising applying the trained model to predict hotspot temperatures for 3D IC chips with variable layers and parameters.

3. The method of claim 1 wherein the SVR algorithm is configured to predict temperature variations corresponding to changes in external cooling strategies, wherein the effect of such changes is modeled as a linear relationship.

4. The method of claim 1 wherein the SVR algorithm is configured to predict temperature variations corresponding to random TSV distributions, wherein the effect of such changes is modeled as a nonlinear relationship.

5. The method of claim 1 wherein the SVR algorithm is configured to:
   predict temperature variations corresponding to changes in external cooling strategies, wherein the effect of such changes is modeled as a linear relationship; and
   predict temperature variations corresponding to random TSV distributions, wherein the effect of such changes is modeled as a nonlinear relationship.

6. A three dimensional (3D) integrated circuit (IC) chip, comprising:
   a multi-layer structure comprising a plurality of vertically stacked semiconductor layers, wherein the multi-layer structure includes:
      a plurality of processor cores distributed across the semiconductor layers; and
      a plurality of Through Silicon Vias (TSVs) arranged within the layers to facilitate electrical connections between the layers, wherein the 3D IC chip is optimized for thermal management based on a predictive model, enabling effective temperature control when utilized with a thermal management system that monitors and adjusts a cooling strategy of the 3D IC chip, wherein a machine learning prediction module comprises the predictive module, the machine learning prediction module comprising a dataset storage unit for storing thermal simulation data and associated parameters of the 3D IC chip, including power distribution, processor core location distribution, and TSV distribution, and wherein the machine learning prediction module comprises a Support Vector Regression (SVR) algorithm integrated within the prediction model, the SVR algorithm configured to predict hotspot temperatures based on changes in the cooling strategy and a relationship thereof is modeled as linear.

7. The 3D IC chip of claim 6 wherein the 3D IC chip comprises a 3D stack chip.

8. The 3D IC chip of claim 7 wherein the 3D stack chip comprises a 3D chip stack structure that includes an interposer that integrates multiple chips including at least one of a CPU, a memory, or an ASIC into one package module.

9. The 3D IC chip of claim 8 wherein the interposer comprises a silicon interposer.

10. The 3D IC chip of claim 8 further comprising a heat sink, wherein a contact area between the package module and the heat sink is smaller than a surface area of the heat sink.

11. The 3D IC chip of claim 6 wherein machine learning prediction module includes a trained model that predicts hotspot temperatures of the 3D IC chip for configurations with variable layers and parameters.

12. A three dimensional (3D) integrated circuit (IC) chip, comprising:
   a multi-layer structure comprising a plurality of vertically stacked semiconductor layers, wherein the multi-layer structure includes:
      a plurality of processor cores distributed across the semiconductor layers; and
      a plurality of Through Silicon Vias (TSVs) arranged within the layers to facilitate electrical connections between the layers, wherein the 3D IC chip is optimized for thermal management based on a predictive model, enabling effective temperature control when utilized with a thermal management system that monitors and adjusts a cooling strategy of the 3D IC chip, wherein a machine learning prediction module comprises the predictive module, the machine learning prediction module comprising a dataset storage unit for storing thermal simulation data and associated parameters of the 3D IC chip, including power distribution, processor core location distribution, and TSV distribution, and wherein the machine learning prediction module comprises a Support Vector Regression (SVR) algorithm integrated within the prediction model, the SVR algorithm configured to predict hotspot temperatures based on variations the TSV distribution, wherein a relationship thereof is modeled as nonlinear.

13. The 3D IC chip of claim 12 wherein:
   the 3D IC chip comprises a 3D stack chip; and
   the 3D stack chip comprises a 3D chip stack structure that includes an interposer that integrates multiple chips including at least one of a CPU, a memory, or an ASIC into one package module.

14. The 3D IC chip of claim 13 wherein the interposer comprises a silicon interposer.

15. The 3D IC chip of claim 13 further comprising a heat sink, wherein a contact area between the package module and the heat sink is smaller than a surface area of the heat sink.

16. The 3D IC chip of claim 13 wherein the 3D stack chip comprises dies stacked between a radiator and a substrate.

17. The 3D IC chip of claim 13 wherein the 3D stack chip includes silicon chips in a middle layer bonded together by thermal grease.

18. The 3D IC chip of claim 13 wherein the 3D stack chip includes heterogeneous integrated CPU processors.

19. The 3D IC chip of claim 13 wherein the 3D stack chip comprises:
   dies stacked between a radiator and a substrate;
   silicon chips in a middle layer bonded together; and
   heterogeneous integrated CPU processors.

20. The 3D IC chip of claim 12 wherein machine learning prediction module includes a trained model that predicts hotspot temperatures of the 3D IC chip for configurations with variable layers and parameters.

* * * * *